United States Patent
Mason et al.

(10) Patent No.: US 12,500,225 B2
(45) Date of Patent: Dec. 16, 2025

(54) SILICON-CARBON COMPOSITE MATERIALS AND METHODS

(71) Applicant: Nexeon Limited, Abingdon (GB)

(72) Inventors: Charles A. Mason, Abingdon (GB); Richard Gregory Taylor, Penarth (GB); Sefa Yilmaz, Moses Lake, WA (US); Kseniia Katok, Wokingham (GB); Joshua Whittam, Faringdon (GB); Limunga Silo Meoto, Abingdon (GB); Mauro Chiacchia, Abingdon (GB)

(73) Assignee: NEXEON LIMITED, London (GB)

( * ) Notice: Subject to any disclaimer, the term of this patent is extended or adjusted under 35 U.S.C. 154(b) by 638 days.

(21) Appl. No.: 17/641,927

(22) PCT Filed: Sep. 10, 2020

(86) PCT No.: PCT/GB2020/052189
§ 371 (c)(1),
(2) Date: Mar. 10, 2022

(87) PCT Pub. No.: WO2021/048556
PCT Pub. Date: Mar. 18, 2021

(65) Prior Publication Data
US 2022/0336791 A1    Oct. 20, 2022

(30) Foreign Application Priority Data
Sep. 10, 2019   (GB) ...................... 1913073

(51) Int. Cl.
H01M 4/36    (2006.01)
H01M 4/38    (2006.01)
(Continued)

(52) U.S. Cl.
CPC .......... *H01M 4/364* (2013.01); *H01M 4/366* (2013.01); *H01M 4/386* (2013.01); *H01M 4/587* (2013.01);
(Continued)

(58) Field of Classification Search
CPC ........ H01M 4/366; H01M 4/386; C23C 16/24
See application file for complete search history.

(56) References Cited

U.S. PATENT DOCUMENTS

| | | | |
|---|---|---|---|
| 11,905,593 B2 * | 2/2024 | Yilmaz | C04B 41/4531 |
| 2012/0264020 A1 * | 10/2012 | Burton | H01M 4/587 |
| | | | 204/192.15 |
| 2022/0336790 A1 * | 10/2022 | Mason | H01M 4/625 |

FOREIGN PATENT DOCUMENTS

| | | | | |
|---|---|---|---|---|
| CN | 108428876 A | | 8/2018 | |
| CN | 108701809 A | * | 10/2018 | C01B 32/05 |

(Continued)

OTHER PUBLICATIONS

International Search Report mailed on Oct. 26, 2020, issued in connection with International Application No. PCT/GB2020/052189, filed on Sep. 10, 2020, 4 pages.
(Continued)

*Primary Examiner* — Amanda C. Walke
(74) *Attorney, Agent, or Firm* — Schwegman Lundberg & Woessner, P.A.

(57) ABSTRACT

The invention provides methods for providing composite particles with a carbon coating and the resulting core-shell particulate material. The process comprises subjecting a plurality of precursor composite particles to a heat treatment in contact with a pyrolytic carbon precursor such that an outer shell of a pyrolytic conductive carbon material is
(Continued)

formed on the precursor composite particles, wherein the heat treatment is carried out at a temperature of no more than 700° C.

23 Claims, 9 Drawing Sheets

(51) Int. Cl.
    *H01M 4/587* (2010.01)
    *H01M 4/62* (2006.01)
    *H01M 10/0525* (2010.01)
    *H01M 4/02* (2006.01)

(52) U.S. Cl.
    CPC ....... *H01M 4/625* (2013.01); *H01M 10/0525* (2013.01); *H01M 2004/027* (2013.01)

(56) References Cited

FOREIGN PATENT DOCUMENTS

| | | |
|---|---|---|
| EP | 2597707 B1 * 12/2018 | ........ H01M 10/0525 |
| WO | 02/27822 A1 4/2002 | |
| WO | WO-2014031929 A1 * 2/2014 | ........ H01M 10/0525 |
| WO | 2017/040299 A1 3/2017 | |
| WO | 2017/140645 A1 8/2017 | |
| WO | 2018/145733 A1 8/2018 | |
| WO | 2018/165610 A1 9/2018 | |
| WO | 2018/229515 A1 12/2018 | |

OTHER PUBLICATIONS

Written Opinion mailed on Oct. 26, 2020, issued in connection with International Application No. PCT/GB2020/052189, filed on Sep. 10, 2020, 6 pages.

* cited by examiner

SILICON-CARBON COMPOSITE MATERIALS AND METHODS

This application is a U.S. National Stage entry of International Patent Application no. PCT/GB2020/052189, filed Sep. 10, 2020, which claims the benefit of priority of United Kingdom Patent Application no. 1913073.1, filed Sep. 10, 2019.

This invention relates to a method of preparing core-shell composite particles comprising carbon and an electroactive material such as silicon. The invention also relates to particulate materials comprising silicon and carbon and having a core-shell structure.

Rechargeable metal-ion batteries are widely used in portable electronic devices such as mobile telephones and laptop computers. Rapid developments in electric and hybrid vehicle technology also represent a significant new market for high-performance rechargeable batteries. The anode of a metal-ion battery typically comprises a metal current collector provided with a layer of an electroactive material (which is defined herein as a material which is capable of inserting and releasing metal ions during the charging and discharging of a battery). When a metal-ion battery is charged, metal ions are transported from the metal-ion-containing cathode layer via the electrolyte and are inserted into the anode material.

Conventional lithium-ion batteries use graphite as the electroactive material in the anode. When a graphite-containing anode is charged, lithium intercalates between the graphite layers to form a material with the empirical formula LixC6 (wherein x is greater than 0 and less than or equal to 1). This means that graphite has a maximum theoretical capacity of 372 mAh/g in a lithium-ion battery, with a practical capacity that is somewhat lower (ca. 340 to 360 mAh/g). The development of portable electronics and electric vehicles with high energy demands means that there is a need for electroactive materials that provide an improvement in the gravimetric and volumetric capacity of graphite.

Materials such as silicon, tin and germanium have a significantly higher capacity for inserted lithium atoms than graphite. Silicon in particular has been identified as a promising alternative to graphite for the manufacture of rechargeable metal-ion batteries having high gravimetric and volumetric capacities because of its very high capacity for lithium (see, for example, Insertion Electrode Materials for Rechargeable Lithium Batteries, Winter, M. et al. in Adv. Mater. 1998, 10, No. 10). At room temperature, silicon has a theoretical maximum specific capacity in a lithium-ion battery of about 3,600 mAh/g (based on $Li_{15}Si_4$).

The high specific capacity of silicon is accompanied by large volumetric changes on charging and discharging. Intercalation of lithium into bulk silicon leads to an increase in the volume of the silicon material of up to 400% of its original volume. Repeated charge-discharge cycles therefore cause significant mechanical stress in the silicon material, resulting in fracturing and delamination of the silicon anode material and deformation of other battery components. The contraction of silicon particles upon delithiation can result in a loss of electrical contact between the anode material and the current collector. A further problem is that a solid electrolyte interphase (SEI) layer forms on fresh silicon surfaces during the initial charging cycle as a result of electrolyte deposition. This SEI layer does not have sufficient mechanical tolerance to accommodate the expansion and contraction of the silicon and delaminates from the silicon surface. Newly exposed silicon surfaces then lead to further electrolyte decomposition and increased thickness of the SEI layer and irreversible consumption of lithium. These failure mechanisms collectively result in an unacceptable loss of electrochemical capacity over successive charging and discharging cycles.

A number of approaches have been proposed to overcome the problems associated with the volume change observed when charging silicon-containing anodes. One approach is to use some form of finely structured silicon as the electroactive material. Fine silicon structures below around 150 nm in cross-section, such as silicon films and silicon nanoparticles, are more tolerant of volume changes on charging and discharging when compared to silicon particles in the micron size range. However, neither of these is particularly suitable for commercial scale applications in their unmodified form; nanoscale particles are difficult to prepare and handle and silicon films do not provide sufficient bulk capacity. The relatively high surface area of finely structured silicon also results in unacceptable capacity loss on the first charging cycle due to excessive SEI formation.

To address the lack of viable silicon-containing electroactive materials, the present inventors have developed a class of composite particles in which silicon is deposited into the pores of a porous conductive material (e.g. a carbon-containing porous material, such as an activated carbon material) with a median pore diameter that is no more than around 5 to 10 nm. It has been identified that through careful control of the total pore volume, the pore size distribution of the conductive material, and the weight ratio of silicon to the conductive material, it is possible to obtain a material with controlled expansion properties, limited SEI formation, and high reversible capacity retention. However, a further improvement in the properties of these materials could be obtained by reducing the surface area. A reduction in surface area has several benefits, including a further reduction in SEI formation and a reduction in the amount of binder that is necessary to form an electrode active layer. Excess binder may contribute to a reduction in rate performance.

There is therefore a need for electroactive materials comprising composite particles of the type described above but with a conductive carbon coating which serves simultaneously to reduce the surface area of the particles, to increase the rate performance of the composite material, and to provide improved conductivity of electrode active layers comprising the core-shell particles. However, a feature of the composite particles described above is a very fine microstructure that includes fine domains of silicon and fine pore walls. The fine microstructure of the composite particles is very important for their functionality as electroactive materials in anodes, but is also incompatible with conventional techniques for applying conductive carbon coatings.

In a first aspect of the invention, there is provided a process for preparing core-shell composite particles, the process comprising the steps of:
(a) providing a plurality of precursor composite particles comprising:
(i) a porous carbon framework comprising micropores and/or mesopores, wherein the total pore volume of micropores and mesopores as measured by gas adsorption is at least 0.4 $cm^3/g$, and wherein the $PD_{50}$ pore diameter of the porous carbon framework is no more than 10 nm; and
(ii) a plurality of nanoscale electroactive material domains disposed with the porous carbon framework;

(b) subjecting the plurality of precursor composite particles to a heat treatment in contact with a pyrolytic carbon precursor such that an outer shell of a pyrolytic conductive carbon material is formed on the precursor composite particles, wherein the heat treatment is carried out at a temperature of no more than 700° C.

Critical to the process of the invention is that pyrolysis of the pyrolytic carbon precursor is carried out at a temperature of no more than 700° C. Known processes for forming pyrolytic carbon coatings generally require temperatures well in excess of 700° C., for example in the range of 800° C. to 1,200° C. However, it has been found that the fine microstructure of the precursor composite particles described above is incompatible to such high temperatures and undergoes various thermally-induced changes, including annealing and crystallisation processes. Annealing of the particle microstructure may result in the removal of void spaces which accommodate expansion of the electroactive material, e.g. silicon. Crystallisation of silicon is also disadvantageous because amorphous silicon has better performance as an electroactive material. In addition, excessive temperature during the formation of pyrolytic carbon coatings can result in the formation of undesirable compounds with low or no electrochemical activity, such as silicon carbides and nitrides. Together, these processes are detrimental to the performance of the carbon-coated particles as electroactive materials in the anodes of lithium-ion batteries.

It has now surprisingly been found that a lower temperature carbon coating process is effective to provide a carbon coating with sufficient graphitic character to provide the required conductivity of the coating, but without deleterious effects on the underlying structure of the precursor composite particle core. The process of the invention therefore provides an effective process for preparing core-shell composite particles with high performance as electroactive materials.

Another advantage of the method of the invention is that it can be applied to materials where the surface area and pore volume are above 100 m$^2$/g and 0.1 mL/g respectively. Open void systems allow the carbon to infiltrate partially into the pore structure such that conductive tendrils extend from the pyrolytic carbon coating into the interior of the particle. A coating combined with these conductive tendrils has the effect of reducing the mean electronic transport length in the core-shell composite particles, instead; allowing the electrons to travel to and from the current collector via a highly conductive carbon matrix during insertion and release of lithium.

The temperature for the heat treatment in step (b) is preferably less than 700° C. For example, the heat treatment may carried out at a temperature of no more than 680° C., or no more than 660° C., or no more than 650° C., or no more than 640° C., or no more than 620° C., or no more than 600° C.

The lower limit for the temperature of the heat treatment in step (b) is not limited. However, the deposition of the carbon coating generally improves as temperature increases. The minimum temperature required will also depend on the type of carbon precursor that is used in the deposition step. Preferably, the temperature for the heat treatment in step (b) is at least 300° C., such as at least 500° C., or at least 520° C., or at least 540° C., or at least 560° C., or at least 580° C.

The carbon precursor may be contacted with the precursor composite particles in one of two ways:
1. vapour-based contact;
2. contact from a liquid or a solution.

Some carbon precursors are suitable for only one of these two contact methods.

Some other carbon precursors are suitable for both contact methods, depending on the temperature at which contact occurs. These carbon precursors may be in a liquid form at low temperatures which sublimes to become a vapour precursor above a set temperature before pyrolysis at a higher temperature. They may optionally be applied to the precursor composite particles as liquid. Examples of such compounds include camphor, anthracene, pentacene, and metal phthalocene complexes.

The pyrolytic carbon precursor may be contacted with the precursor composite particles as a vapour during the heat treatment step, preferably a hydrocarbon vapour. Suitable hydrocarbons include polycyclic hydrocarbons comprising from 10 to 25 carbon atoms and optionally from 1 to 3 heteroatoms, optionally wherein the polyaromatic hydrocarbon is selected from naphthalene, substituted naphthalenes such as di-hydroxynaphthalene, anthracene, tetracene, pentacene, fluorene, acenapthene, phenanthrene, fluoranthrene, pyrene, chrysene, perylene, coronene, fluorenone, anthraquinone, anthrone and alkyl-substituted derivatives thereof. Suitable pyrolytic carbon precursors also include bicyclic monoterpenoids, optionally wherein the bicyclic monoterpenoid is selected from camphor, borneol, eucalyptol, camphene, careen, sabinene, thujene and pinene. Further suitable pyrolytic carbon precursors include $C_1$-$C_{10}$ or $C_2$-$C_{10}$ hydrocarbons, optionally wherein the hydrocarbons are selected from alkanes, alkenes, alkynes, cycloalkanes, cycloalkenes, and arenes, for example methane, ethylene, propylene, acetylene and cyclohexane. Other suitable pyrolytic carbon precursors include phthalocyanine, sucrose, starches, graphene oxide, reduced graphene oxide, pyrenes, perhydropyrene, triphenylene, tetracene, benzopyrene, perylenes, coronene, and chrysene. Preferably the carbon precursor comprises acetylene, more preferably the carbon precursor is acetylene.

The hydrocarbon vapour may be contacted with a transition metal catalyst at a temperature of at least 500° C. prior to contact with the precursor composite particles. The transition metal catalyst may be selected from nickel, iron, cobalt, copper and mixtures thereof, and most preferably is nickel. The transition metal catalyst may be in the form of a mesh, wherein the mesh is placed in the flow path of the vapour prior to contact with the precursor composite particles.

Alternatively, the transition metal catalyst may be disposed on the surface of the precursor composite particles. For instance, gaseous nickel carbonyl may be thermally decomposed to deposit nickel onto the surface of the precursor composite particles prior to step (b). Optionally, the deposition of nickel may be carried out in the same reactor as the heat treatment detailed above. A suitable temperature for the decomposition of nickel carbonyl is ca. 220° C. to 250° C. Optionally the nickel may be converted back to nickel carbonyl gas after the deposition of the carbon coating by contacting the coated particles with carbon monoxide gas, e.g. at a temperature of ca. 50° C. to 60° C. The nickel carbonyl gas may thus be recycled.

The transition metal-catalysed process provides a further improvement in the formation of a pyrolytic carbon coating at low temperatures. In addition, recovery and recycling of the nickel in the form of nickel carbonyl gas makes the process cost-effective.

The pyrolytic carbon precursor may alternatively be contacted with the precursor composite particles in liquid form. In particular, the precursor composite particles may be contacted with a solution or dispersion of the pyrolytic carbon precursor in a solvent, followed by removal of the solvent to provide precursor composite particles coated with the pyrolytic carbon precursor, prior to the heat treatment. Suitable pyrolytic carbon precursors for contacting with the precursor composite particles in liquid form include polymers and oligomers comprising a carbon-containing backbone, for example polyvinylpyrrolidone (PVP) or a copolymer of vinylpyrrolidone with one or more other ethylenically unsaturated monomers.

Carbon precursor compounds that may be deposited from solution include polydopamine, poly(diallyldimethylammonium chloride) (PDDA), citric acid, mixtures comprising citric acid and ethanol, polyacrylonitrile (PAN), PAN derivatives, polymerized polypyrrole (PPy) composites, melamine resin such as melamine-formaldehyde resin, pitch, glucose, sucrose, phenolic resin, polyvinyl alcohol (PVA), polyacrylic acid (PAA), resorcinol-formaldehyde resin, poly(methyl methacrylate) (PMMA), camphor, anthracene, pentacene, and metal phthalocene complexes.

Optionally a dopant material may be incorporated into the carbon coating. A dopant material may be incorporated into the coating by incorporating a dopant precursor. Preferably the dopant is boron or phosphorus. Doping of the pyrolytic carbon coating will further enhance the conductivity of the coating. Preferably, the electroactive material domains are also doped by the incorporation of the dopant material into the carbon coating, additionally enhancing their conductivity.

If the pyrolytic carbon precursor is provided as a vapour, it may be used together with a gaseous precursor of a dopant material. When the dopant is boron, suitable gaseous dopant precursors include borane ($BH_3$), diborane ($B_2H_6$), triisopropyl borate ($[(CH_3)_2CHO]_3B$), triphenylborane ($(C_6H_5)_3B$), and tris(pentafluorophenyl)borane ($(C_6F_5)_3B$, preferably diborane. When the dopant is phosphorus, a suitable gaseous dopant precursor is phosphine ($PH_3$).

If the pyrolytic carbon precursor is a volatile liquid, the dopant may also be introduced as a volatile liquid. For boron, a suitable dopant precursor is triethylborane. For phosphorus a suitable dopant precursor is triethylphosphine.

If the pyrolytic carbon precursor is supplied as a solution or a suspension, suitable boron dopant precursors include boric acid ($H_3BO_3$), sodium tetraborate ($Na_2[B_4O_5(OH)_4]\cdot 8H_2O$), borazine ($B_3H_6N_3$), and ammonia borane ($BH_6N$), and the preferable source would be boric acid. When the dopant is phosphorus suitable precursors include phosphoric acid ($H_3PO_4$) or phosphonates and phosphonic acids.

Another option when using liquid, solution phase, or suspended pyrolytic carbon precursors is to introduce the dopant into the reactor as a gas, for example in an inert gas stream fed to the reactor headspace. Suitable gaseous dopant precursors include those described above.

The outer shell of conductive carbon material that is deposited in the method of the invention preferably has a thickness after pyrolysis of no more than 10 nm, or no more than 5 nm, or no more than 4 nm, or no more than 2 nm, or no more than 1 nm.

The outer shell of conductive carbon material that is deposited in the method of the invention may be amorphous, crystalline, or have both amorphous and crystalline domains. Preferably the carbon coating is amorphous carbon. Preferred types of crystalline carbon coating are graphite and graphene.

The porous carbon framework comprises a three-dimensionally interconnected open pore network comprising micropores and/or mesopores and optionally a minor volume of macropores. In accordance with conventional IUPAC terminology, the term "micropore" is used herein to refer to pores of less than 2 nm in diameter, the term "mesopore" is used herein to refer to pores of 2 to 50 nm in diameter, and the term "macropore" is used to refer to pores of greater than 50 nm diameter.

References herein to the volume of micropores, mesopores and macropores in the porous carbon framework, and also any references to the distribution of pore volume within the porous carbon framework, are intended to define the pore structure of the porous carbon framework when considered in isolation. Occupation of the pores by nanoscale electroactive material domains results in a reduction of the measurable pore volume, however this is not taken into account for the purpose of defining the pore structure of the porous carbon framework.

The total volume of micropores and mesopores and the pore size distribution of micropores and mesopores are determined using nitrogen gas adsorption at 77 K down to a relative pressure $p/p_0$ of [or below] of $10^{-6}$ using quenched solid density functional theory (QSDFT) in accordance with standard methodology as set out in ISO 15901-2 and ISO 15901-3. Nitrogen gas adsorption is a technique that characterises the porosity and pore diameter distributions of a material by allowing a gas to condense in the pores of a solid. As pressure increases, the gas condenses first in the pores of smallest diameter and the pressure is increased until a saturation point is reached at which all of the pores are filled with liquid. The nitrogen gas pressure is then reduced incrementally, to allow the liquid to evaporate from the system. Analysis of the adsorption and desorption isotherms, and the hysteresis between them, allows the pore volume and pore size distribution to be determined. Suitable instruments for the measurement of pore volume and pore size distributions by nitrogen gas adsorption include the TriStar II and TriStar II Plus porosity analyzers, which are available from Micromeritics Instrument Corporation, USA, and the Autosorb IQ porosity analyzers, which are available from Quantachrome Instruments.

Nitrogen gas adsorption is effective for the measurement of pore volume and pore size distributions for pores having a diameter up to 50 nm, but is less reliable for pores of much larger diameter. For the purposes of the present invention, nitrogen adsorption is therefore used to determine pore volumes and pore size distributions only for pores having a diameter up to and including 50 nm (i.e. only for micropores and mesopores). $PD_{50}$ are likewise determined relative to the total volume of micropores and mesopores only.

The porous conductive particles are characterised by a total volume of micropores and mesopores (i.e. the total pore volume in the range from 0 to 50 nm) of at least 0.4 $cm^3/g$ as measured by gas adsorption. Typically, the porous carbon framework includes both micropores and mesopores. However, it is not excluded that porous carbon frameworks may be used which include micropores and no mesopores, or mesopores and no micropores.

More preferably, the total volume of micropores and mesopores in the porous conductive particles is at least 0.45 $cm^3/g$, or at least 0.5 $cm^3/g$, at least 0.55 $cm^3/g$, or at least 0.6 $cm^3/g$, or at least 0.65 $cm^3/g$, or at least 0.7 $cm^3/g$, or at least 0.75 $cm^3/g$, or at least 0.8 $cm^3/g$, at least 0.85 $cm^3/g$, or at least 0.9 $cm^3/g$, or at least 0.95 $cm^3/g$, or at least 1 $cm^3/g$. The use of high porosity conductive particles may be advantageous since it allows a larger amount of silicon to be accommodated within the pore structure.

The internal pore volume of the porous conductive particles is suitably capped at a value at which increasing fragility of the porous conductive particles outweighs the advantage of increased pore volume accommodating a larger amount of silicon. Preferably, the total volume of micropores and mesopores in the porous conductive particles is no more than 2.2 cm$^3$/g, or no more than 2 cm$^3$/g, or no more than 1.8 cm$^3$/g, or no more than 1.6 cm$^3$/g, or no more than 1.5 cm$^3$/g, or no more than 1.45 cm$^3$/g, or no more than 1.4 cm$^3$/g, or no more than 1.35 cm$^3$/g, or no more than 1.3 cm$^3$/g, or no more than 1.25 cm$^3$/g, or no more than 1.2 cm$^3$/g.

In some examples, the total volume of micropores and mesopores in the porous conductive particles may be in the range from 0.7 to 2.2 cm$^3$/g, or in the range from 0.7 to 2 cm$^3$/g, or in the range from 0.8 to 2 cm$^3$/g, range from 0.8 to 1.8 cm$^3$/g, or in the range from 0.9 to 1.8 cm$^3$/g, or in the range from 0.9 to 1.6 cm$^3$/g, or in the range from 1 to 1.6 cm$^3$/g, or in the range from 1.1 to 1.6 cm$^3$/g.

In other examples, the total volume of micropores and mesopores in the porous conductive particles may be in the range from 0.4 to 0.75 cm$^3$/g, or from 0.4 to 0.7 cm$^3$/g, or from 0.4 to 0.65 cm$^3$/g, 0.45 to 0.75 cm$^3$/g, or from 0.45 to 0.7 cm$^3$/g, or from 0.45 to 0.65 cm$^3$/g, or from 0.45 to 0.6 cm$^3$/g.

In other examples, the total volume of micropores and mesopores in the porous conductive particles may be in the range from 0.6 to 2 cm$^3$/g, or from 0.6 to 1.8 cm$^3$/g, or from 0.7 to 1.8 cm$^3$/g, or from 0.7 to 1.6 cm$^3$/g, or from 0.8 to 1.6 cm$^3$/g, or from 0.8 to 1.5 cm$^3$/g, or from 0.8 to 1.4 cm$^3$/g, or from 0.9 to 1.5 cm$^3$/g, or from 0.9 to 1.4 cm$^3$/g, or from 1 to 1.4 cm$^3$/g.

The pore size distribution of the porous conductive particles may be monomodal, bimodal or multimodal. As used herein, the term "pore size distribution" relates to the distribution of pore size relative to the cumulative total internal pore volume of the porous conductive particles. A bimodal or multimodal pore size distribution may be preferred since close proximity between micropores and pores of larger diameter provides the advantage of efficient ionic transport through the porous network to the nanoscale electroactive material domains.

In view of the limitations of available analytical techniques it is not possible to measure pore volumes and pore size distributions across the entire range of micropores, mesopores and macropores using a single technique. In the case that the porous carbon framework comprises macropores, the volume of pores having diameter in the range from greater than 50 nm and up to 100 nm may be measured by mercury porosimetry and is preferably no more than 0.3 cm$^3$/g, or no more than 0.20 cm$^3$/g, or no more than 0.1 cm$^3$/g, or no more than 0.05 cm$^3$/g. A small fraction of macropores may be useful to facilitate electrolyte access into the pore network, but the advantages of the invention are obtained substantially by accommodating silicon in micropores and smaller mesopores.

Any pore volume measured by mercury porosimetry at pore sizes of 50 nm or below is disregarded (as set out above, nitrogen adsorption is used to characterize the mesopores and micropores). Pore volume measured by mercury porosimetry above 100 nm is assumed for the purposes of the invention to be inter-particle porosity and is also disregarded.

Mercury porosimetry is a technique that characterizes the porosity and pore diameter distributions of a material by applying varying levels of pressure to a sample of the material immersed in mercury. The pressure required to intrude mercury into the pores of the sample is inversely proportional to the size of the pores. Values obtained by mercury porosimetry as reported herein are obtained in accordance with ASTM UOP578-11, with the surface tension y taken to be 480 mN/m and the contact angle φ taken to be 140° for mercury at room temperature. The density of mercury is taken to be 13.5462 g/cm$^3$ at room temperature. A number of high precision mercury porosimetry instruments are commercially available, such as the AutoPore IV series of automated mercury porosimeters available from Micromeritics Instrument Corporation, USA. For a complete review of mercury porosimetry reference may be made to P. A. Webb and C. Orr in "Analytical Methods in Fine Particle Technology, 1997, Micromeritics Instrument Corporation, ISBN 0-9656783-0.

It will be appreciated that intrusion techniques such as gas adsorption and mercury porosimetry are effective only to determine the pore volume of pores that are accessible to nitrogen or to mercury from the exterior of the porous conductive particles. Porosity values specified herein shall be understood as referring to the volume of open pores, i.e. pores that are accessible to a fluid from the exterior of the porous carbon framework. Fully enclosed pores which cannot be identified by nitrogen adsorption or mercury porosimetry shall not be taken into account herein when determining porosity values. Likewise, any pore volume located in pores that are so small as to be below the limit of detection by nitrogen adsorption is not taken into account.

The general term "$PD_n$ pore diameter" as used herein refers to the volume-based nth percentile pore diameter, based on the total volume of micropores and mesopores. For instance, the term "$PD_{90}$ pore diameter" as used herein refers to the pore diameter below which 90% of the total micropore and mesopore volume, represented by $P^1$, is found and the $PD_{50}$ pore diameter is the median pore diameter below which 50% of the total micropore and mesopore volume is found.

The $PD_{90}$ pore diameter of the porous carbon framework may be no more than 20 nm, or no more than 15 nm. Preferably, the $PD_{90}$ pore diameter is no more than 12 nm or no more than 10 nm, or no more than 8 nm, or no more than 6 nm. Preferably, the $PD_{90}$ pore diameter of the porous carbon framework is at least 3 nm, or at least 3.2 nm, or at least 3.5 nm, or at least 3.8 nm, or at least 4 nm.

The $PD_{30}$ pore diameter of the porous carbon framework is preferably no more than 1.6 nm, or no more than 1.5 nm, or no more than 1.4 nm, or no more than 1.3 nm, or no more than 1.2 nm, or no more than 1.1 nm, or no more than 1 nm. Preferably, the $PD_{30}$ pore diameter of the porous carbon framework is preferably at least 0.45 nm, or at least 0.5 nm, or at least 0.6 nm, or at least 0.7 nm.

The $PD_{50}$ pore diameter of the conductive porous particle framework is preferably no more than 8 nm, or no more than 6 nm, or no more than 5 nm, or no more than 4 nm, or no more than 3 nm, or no more than 2.5 nm, or no more than 2 nm, or no more than 1.5 nm. Preferably, the $PD_{50}$ pore diameter of the porous carbon framework is at least 1 nm, or at least 1.1 nm, or at least 1.2 nm. Therefore, in accordance with the invention, at least 50% of the total volume of micropores and mesopores in the conductive porous particle framework is preferably in the form of pores having a diameter of less than 8 nm.

For the avoidance of doubt, any macropore volume (pore diameter greater than 50 nm) is not taken into account for the purpose of determining $PD_{50}$ values.

In general, the precursor composite particles may have a $D_{50}$ particle diameter in the range from 1 to 50 μm. Optionally, the $D_{50}$ particle diameter of the precursor composite particles may be at least 1.5 μm, or at least 2 μm, or at least 3 µm, or at least 4 µm, or at least 5 µm. Optionally the $D_{50}$ particle diameter of the precursor composite particles may be no more than 40 µm, or no more than 30 µm, or no more than 25 µm, or no more than 20 µm, or no more than 18 µm, or no more than 15 µm, or no more than 12 µm, or no more than 10 µm.

For instance, the precursor composite particles may have a $D_{50}$ particle diameter in the range from 1 to 25 µm, or from 1 to 20 µm, or from 2 to 25 µm, or from 2 to 20 µm, or from 2 to 18 µm, or from 3 to 20 µm, or from 3 to 18 µm, or from 3 to 15 µm, or from 4 to 18 µm, or from 4 to 15 µm, or from 4 to 12 µm, or from 5 to 15 µm, or from 5 to 12 µm or from 5 to 10 µm. Precursor composite particles within these size ranges and having porosity and a pore diameter distribution as set out herein are ideally suited for the preparation of composite particles for use in anodes for metal-ion batteries. These particles provide core-shell composite particles with good dispersibility in slurries, structural robustness, high capacity retention over repeated charge-discharge cycles, and suitability for forming dense electrode layers of uniform thickness in the conventional thickness range from 20 to 50 µm.

For the avoidance of doubt, the term "particle diameter" as used herein refers to the equivalent spherical diameter (esd), i.e. the diameter of a sphere having the same volume as a given particle, wherein the particle volume is understood to include the volume of any intra-particle pores. The terms "$D_{50}$" and "$D_{50}$ particle diameter" as used herein refer to the volume-based median particle diameter, i.e. the diameter below which 50% by volume of the particle population is found. The terms "$D_{10}$" and "$D_{10}$ particle diameter" as used herein refer to the 10th percentile volume-based median particle diameter, i.e. the diameter below which 10% by volume of the particle population is found. The terms "$D_{90}$" and "$D_{90}$ particle diameter" as used herein refer to the 90th percentile volume-based median particle diameter, i.e. the diameter below which 90% by volume of the particle population is found.

Particle diameters and particle size distributions can be determined by standard laser diffraction techniques in accordance with ISO 13320:2009. Laser diffraction relies on the principle that a particle will scatter light at an angle that varies depending on the size the particle and a collection of particles will produce a pattern of scattered light defined by intensity and angle that can be correlated to a particle size distribution. A number of laser diffraction instruments are commercially available for the rapid and reliable determination of particle size distributions. Unless stated otherwise, particle size distribution measurements as specified or reported herein are as measured by the conventional Malvern Mastersizer™ 3000 particle size analyzer from Malvern Instruments. The Malvern Mastersizer™ 3000 particle size analyzer operates by projecting a helium-neon gas laser beam through a transparent cell containing the particles of interest suspended in an aqueous solution. Light rays which strike the particles are scattered through angles which are inversely proportional to the particle size and a photodetector array measures the intensity of light at several predetermined angles and the measured intensities at different angles are processed by a computer using standard theoretical principles to determine the particle size distribution. Laser diffraction values as reported herein are obtained using a wet dispersion of the particles in distilled water. The particle refractive index is taken to be 3.50 and the dispersant index is taken to be 1.330. Particle size distributions are calculated using the Mie scattering model.

The $D_{10}$ particle diameter of the precursor composite particles is preferably at least 0.2 µm, or at least 0.5 µm, or at least 0.8 µm, or at least 1 µm, or at least 1.5 µm, or at least 2 µm. By maintaining the $D_{10}$ particle diameter at 0.2 µm or more, the potential for undesirable agglomeration of sub-micron sized particles is reduced, resulting in improved fluidization behaviour, and improved dispersibility of the composite particles formed.

The $D_{90}$ particle diameter of the precursor composite particles is preferably no more than 40 µm, or no more than 30 µm, or no more than 25 µm, or no more than 20 µm. The use of larger precursor composite particles may result in non-uniform forming packing of the core-shell composite particle product in electrode active layers, thus disrupting the formation of dense electrode layers, particularly electrode layers having a thickness in the range from 20 to 50 µm.

The precursor composite particles preferably have a narrow size distribution span. For instance, the particle size distribution span (defined as $(D_{90}-D_{10})/D_{50}$) is preferably 5 or less, more preferably 4 or less, more preferably 3 or less, more preferably 2 or less, and most preferably 1.5 or less. By maintaining a narrow size distribution span, efficient packing of the core-shell composite particle product into dense electrode layers is more readily achievable.

The porous carbon framework preferably comprises at least 80 wt % carbon, more preferably at least 90 wt % carbon, more preferably at least 95 wt % carbon, and optionally at least 98 wt % or at least 99 wt % carbon. The carbon may be crystalline carbon or amorphous carbon, or a mixture of amorphous and crystalline carbon. The porous carbon particles may be either hard carbon particles or soft carbon particles and may suitably be obtained by known procedures involving the pyrolysis of polymers. A wide variety of porous carbon particles of different specifications is available from commercial suppliers.

The precursor composite particles may have a range of different electroactive material loadings. For example, the amount of electroactive material in the precursor composite particles may be selected such that at least 25% and as much as 80% or more of the internal pore volume of the porous carbon framework is occupied by the electroactive material. For example, the electroactive material may occupy from 25% to 60%, or from 25% to 55%, or from 25% to 50%, or from 25% to 45%, or from 25% to 40% of the internal pore volume of the porous carbon framework. Within these preferred ranges, the pore volume of the porous carbon framework is effective to accommodate expansion of the electroactive material during charging and discharging, but avoids excess pore volume which does not contribute to the volumetric capacity of the core-shell composite particles. However, the amount of electroactive material is also not so high as to impede effective lithiation due to inadequate metal-ion diffusion rates or due to inadequate expansion volume resulting in mechanical resistance to lithiation.

The electroactive material in the precursor composite particles is preferable selected from silicon, tin, germanium, aluminium and mixtures thereof. A preferred electroactive material is silicon.

In the case that the electroactive material is silicon, the preferred mass ratio of silicon to the porous carbon framework is preferably in the range from $[0.5 \times P^1$ to $1.3 \times P_1]$: 1, wherein $P_1$ is a dimensionless quantity having the magnitude of the total pore volume of micropores and mesopores in the porous conductive particles, as expressed in $cm^3/g$ (e.g. if the porous carbon particles have a total volume of micropores and mesopores of 1.2 $cm^3/g$, then $P_1=1.2$). This formula takes into account the density of silicon and the pore volume of the porous conductive particles to define a weight ratio of silicon at which the pore volume is around 20% to 55% occupied, assuming that the silicon is located entirely within the internal pore volume.

In practice, it is preferred that at least 90 wt %, more preferably at least 95 wt %, even more preferably at least 98 wt % of the electroactive material in the precursor composite particles is located within the internal pore volume of the porous carbon framework such that there is no or very little silicon located on the external surfaces of the precursor composite particles. Preparing the precursor composite particles by chemical vapour infiltration (CVI) is an effective way to ensure that very little of the electroactive material is located on external surfaces. This is because the reaction kinetics of the CVI process favour deposition of silicon into small pores and therefore preferential deposition of silicon occurs on internal surfaces of the porous conductive particles.

The heat treatment in step (b) may suitably be carried out for a duration of 1 to 3 hours.

The step (a) of providing a plurality of precursor composite particles may comprise contacting an electroactive material precursor with a plurality of porous carbon particles at a temperature of between 200° C. and 800° C., thereby depositing electroactive material into the pores of by the carbon particles. The electroactive material may be selected from silicon, tin, germanium, aluminium and mixtures thereof. The preferred electroactive material is silicon.

Suitable gaseous precursors for the deposition of silicon include silane ($SiH_4$) and trichlorosilane ($SiHCl_3$). CVI is of particular utility for preparing the electroactive materials disclosed herein since it results in very little damage to the geometry of the porous substrate.

Suitable silicon-containing precursors include silane ($SiH_4$), disilane ($Si_2He$), trisilane ($Si_3H_8$), tetrasilane ($Si_4H_{10}$), or chlorosilanes such as trichlorosilane ($HSiCl_3$) or methylchlorosilanes such as methyltrichlorosilane ($CH_3SiCl_3$) or dimethyldichlorosilane ($(CH_3)_2SiCl_2$). Preferably the silicon-containing precursor is silane.

Suitable tin-containing precursors include bis[bis(trimethylsilyl)amino]tin(II) ($[[(CH_3)_3Si]_2N]_2Sn$), tetraallyltin ($(H_2C=CHCH_2)_4Sn$), tetrakis(diethylamido)tin(IV) ($[[(C_2H_5)_2N]_4Sn$), tetrakis(dimethylamido)tin(IV) ($[[(CH_3)_2N]_4Sn$), tetramethyltin ($Sn(CH_3)_4$), tetravinyltin ($Sn(CH=CH_2)_4$), tin(II) acetylacetonate ($C_{10}H_{14}O_4Sn$), trimethyl(phenylethynyl)tin ($C_6H_5C\equiv CSn(CH_3)_3$), and trimethyl(phenyl)tin ($C_6H_5Sn(CH_3)_3$). Preferably the tin-containing precursor is tetramethyltin.

Suitable aluminium-containing precursors include aluminium tris(2,2,6,6-tetramethyl-3,5-heptanedionate) (Al($OCC(CH_3)_3CHCOC(CH_3)_3)_3$), trimethylaluminium ($(CH_3)_3Al$), and tris(dimethylamido)aluminium(III) (Al(N($CH_3)_2)_3$). Preferably the aluminium-containing precursor is trimethylaluminium.

Suitable germanium-containing precursors include germane ($GeH_4$), hexamethyldigermanium ($(CH_3)_3GeGe(CH_3)_3$), tetramethylgermanium ($(CH_3)_4Ge$), tributylgermanium hydride ($[CH_3(CH_2)_3]_3GeH$), triethylgermanium hydride ($(C_2H_5)_3GeH$), and triphenylgermanium hydride ($(C_6H_5)_3GeH$). Preferably the germanium-containing precursor is germane.

The CVI process may also utilise a gaseous precursor of a dopant material to deposit a doped electroactive material into the micropores and/or mesopores of the porous carbon frameworks. When the dopant is boron suitable precursors include borane ($BH_3$), diborane ($B_2H_6$), triisopropyl borate ($[(CH_3)_2CHO]_3B$), triphenylborane ($(C_6H_5)_3B$), and tris(pentafluorophenyl)borane ($(C_6F_5)_3B$, preferably borane. When the dopant is phosphorous a suitable precursor is phosphine ($PH_3$).

The precursors may be used either in pure form or more usually as a diluted mixture with an inert carrier gas, such as nitrogen or argon. For instance, the precursor may be used in an amount in the range from 0.5-20 vol %, or 1-10 vol %, or 1-5 vol % based on the total volume of the precursor and the inert carrier gas. The CVI process is suitably carried out at low partial pressure of gaseous precursor with total pressure at or close to 101.3 kPa (i.e. at atmospheric pressure, 1 atm), the remaining partial pressure made up to atmospheric pressure using an inert padding gas such as hydrogen, nitrogen or argon. The presence of oxygen should be minimised to prevent undesired oxidation of the deposited electroactive material, in accordance with conventional procedures for working in an inert atmosphere. Preferably, the oxygen content is less than 0.01 vol %, more preferably less than 0.001 vol % based on the total volume of gas used in step (b).

The temperature of the CVI process is suitably chosen to pyrolyse the precursor to the electroactive material. The CVI process is suitably performed at temperature in the range of 200-800° C., or 400-700° C., or 400-600° C., or 400 to 550° C., or 450-550° C., or 450-500° C. Preferably the CVI process is performed at a temperature in the range of 400-500° C., preferably 450-500° C.

The surfaces of electroactive materials deposited by CVI are reactive to oxygen and form an native oxide layer when exposed to atmospheric oxygen. In the case of silicon, an amorphous silicon dioxide film is formed immediately when a silicon surface is exposed to oxygen. The formation of the native oxide layer is exothermic and therefore requires careful process control to prevent overheating or even combustion of the particulate material during manufacture. The presence of a native oxide layer is associated with irreversible capacity loss and reduced cycle life, and so may be deleterious to the performance of the electroactive materials in lithium-ion batteries. It is therefore preferred that the electroactive material is not exposed to oxygen prior to deposition of the lithium-ion permeable filler material.

More preferably, step (b) of the process of the invention further comprises a further step (b2) of contacting the surface of the deposited electroactive material with a passivating agent, wherein the electroactive material is not exposed to oxygen prior to contact with the passivating agent. A passivating agent is defined herein as a compound that is capable of modifying the surface of the electroactive material in such a way as to inhibit or prevent the formation of surface oxides.

Suitable passivating agents include compounds comprising an alkene, alkyne or carbonyl functional group, more preferably a terminal alkene, terminal alkyne or aldehyde group.

Preferred passivating agents include one or more compounds of the formulae:

   (i)

   (ii)

   (iii)

wherein R represents H or an unsubstituted or substituted aliphatic or aromatic hydrocarbyl group having from 1 to 20 carbon atoms, preferably from 2 to 10 carbon atoms, or wherein two R groups in formula (i) form an unsubstituted or substituted hydrocarbyl ring structure comprising from 3 to 8 carbon atoms. Particularly preferred passivating agents include one or more compounds of the formulae:

$$CH_2{=}CH{-}R; \text{ and} \quad (i)$$

$$HC{\equiv}C{-}R; \quad (ii)$$

wherein R is as defined above. Preferably R is unsubstituted.

Examples of suitable compounds include ethylene, propylene, 1-butene, butadiene, 1-pentene, 1,4-pentadiene, 1-hexene, 1-octene, styrene, divinylbenzene, acetylene, phenylacetylene, norbornene, norbornadiene and bicyclo[2.2.2]oct-2-ene. Mixtures of different passivating agents may also be used.

It is understood that the alkene, alkyne or carbonyl group of the passivating agent undergoes an insertion reaction with M-H groups at the surface of the electroactive material (where M represents an atom of the electroactive material) to form a covalently passivated surface which is resistant to oxidation by air. When silicon is the electroactive material, the passivation reaction between the silicon surface and the passivating agent may be understood as a form of hydrosilylation, as shown schematically below.

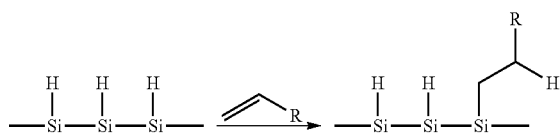

Other suitable passivating agents include compounds including an active hydrogen atom bonded to oxygen, nitrogen, sulphur or phosphorus. For example, the passivating agent may be an alcohol, amine, thiol or phosphine.

Reaction of the group —XH with hydride groups at the surface of the electroactive material is understood to result in elimination of $H_2$ and the formation of a direct bond between X and the electroactive material surface.

Suitable passivating agents in this category include compounds of the formula HX—R, wherein X represents O, S, NR or PR, and wherein each R is independently as defined above. Two R groups in formula (iv) may also form an unsubstituted or substituted hydrocarbyl ring structure comprising from 3 to 8 carbon atoms. Preferably X represents O or NH and R represents an optionally substituted aliphatic or aromatic group having from 2 to 10 carbon atoms. Amine groups may also be incorporated into a 4-10 membered aliphatic or aromatic ring structure, as in pyrrolidine, pyrrole, imidazole, piperazine, indole, or purine.

Contacting of the electroactive material with the passivating agent in step (b2) may be carried out at a temperature in the range of 25-700° C. For example, step (b2) may suitably be carried out within the preferred temperature ranges for step (b) and/or step (c) as set out here in. Preferably, step (c) is carried out at the same temperature as step (b2) or at a higher temperature than step (b2). For example, step (b2) may be carried out at a temperature in the range of from 25° C. to less than 500° C., and step (c) may be carried out at a temperature in the range of from 500-700° C.

Following passivation of the electroactive material surface, the lithium-ion permeable filler material may be deposited in step (c) as described above. The R group of the passivating agents defined above may be incorporated into the lithium ion permeable filler so as to form a covalent bond between the lithium ion permeable filler and the surface of the electroactive material via the passivating agent.

In the case that the lithium-ion permeable filler material is a conductive pyrolytic carbon material, the same compound may function as both the passivating agent and the pyrolytic carbon precursor. For example, if styrene is selected as the pyrolytic carbon precursor, then it will also function as a passivating agent provided that the electroactive material is not exposed to oxygen prior to contact with styrene. Therefore, step (c) may comprise may comprise depositing a conductive pyrolytic carbon material by a CVI process, wherein the pyrolytic carbon precursor is the same as the passivating agent used in step (b2). In this case, passivation in step (b2) and deposition of the conductive carbon material in step (c) may be carried out simultaneously, for example at a temperature in the range of from 500-700° C. Alternatively, passivation in step (b2) and deposition of the conductive carbon material in step (c) may be carried out sequentially, with the same material as the passivating agent and the pyrolytic carbon precursor, but wherein step (c) is carried out at a higher temperature than step (b2). For example, step (b2) may be carried out at a temperature in the range of from 25° C. to less than 500° C., and step (c) may be carried out at a temperature in the range of from 500-700° C.

Alternatively, different compounds may be used as the passivating agent in step (b2) and as the pyrolytic carbon precursor in step (c). For example, the electroactive material may first be contacted with a passivating agent in step (b2), followed by deposition of a conductive pyrolytic carbon material in step (c), wherein the pyrolytic carbon precursor used in step (c) is different from the passivating agent used in step (b2). For example, the passivating agent in step (b2) could be styrene, and the pyrolytic carbon precursor in step (c) could be a compound such as cyclohexane which is capable of forming a pyrolytic carbon material but is not capable of passivating the electroactive material surface. Where the passivating agent and pyrolytic carbon precursor are different materials, steps (b2) and (c) may be carried out at the same temperature, for example in the range of from 500-700° C. Alternatively, step (c) may be carried out at a higher temperature than step (b2). For example, step (b2) may be carried out at a temperature in the range of from 25° C. to less than 500° C., and step (c) may be carried out at a temperature in the range of from 500-700° C.

A further suitable passivating agent is ammonia. Step (b2) may therefore comprise contacting the surface of the deposited electroactive material with ammonia at a temperature in the range of from 200-800° C., preferably from 400-700° C. For example, where the passivating agent is ammonia, step (b2) may be carried out at the same temperature as is used to deposit the electroactive material in step (b). The temperature is then increased if necessary into the range of 500-1,000° C. to form a crystalline nitride surface (e.g. a silicon nitride surface of the formula $SiN_x$, wherein $x \leq 4/3$). Passivation with ammonia therefore provides an alternative means to limit oxidation of the electroactive material. As sub-stoichiometric silicon nitride is conductive, this step will also result in the formation of a conductive network that will allow for faster charging and discharge of the electroactive material.

When the electroactive material is silicon, preferably the silicon is amorphous. The amorphous character of silicon can be measured by X-Ray diffraction (XRD), which is demonstrated in FIG. 3 for Example 4.

One of the benefits of the invention is that the temperature of the carbon coating process prevents or substantially reduces annealing of the composite particle microstructure. The microstructure of the composite particles can be examined by TGA analysis. This method of analysis relies on the principle that a weight gain is observed when elemental silicon is oxidized to silicon dioxide ($SiO_2$) in air and at elevated temperature. The mechanisms by which silicon oxidizes are dependent on temperature. Silicon atoms at the surface of a silicon nanostructure are oxidized at a lower temperature than silicon atoms in the bulk of a silicon nanostructure (reference: Bardet et al., *Phys. Chem. Chem. Phys.* (2016), 18, 18201). TGA analysis allows for the relative content of surface silicon to be quantified, based on the weight gain that is observed as silicon is oxidized to silicon dioxide ($SiO_2$) in air and at elevated temperature. By plotting the weight gain against temperature, it is possible to differentiate and quantify the fine and coarse silicon in the sample.

The determination of the amount of unoxidized surface silicon is derived from the characteristic TGA trace for these materials, as shown in FIG. 1. Following an initial mass loss up to ca. 300° C. (shown in FIG. 1 as the mass reduction from (a) to (b)) a significant increase in mass is observed starting at ca. 400° C. and peaking between 550° C. and 650° C. (shown in FIG. 1 as the mass increase from (b) to (c)). A reduction in mass is then observed as the porous carbon framework is oxidized to $CO_2$ gas (the mass reduction from (c)), then above ca. 800° C. a mass increase is again observed corresponding to the continued conversion of silicon to $SiO_2$ which increases toward an asymptotic value above 1000° C. as silicon oxidation goes to completion (the mass increase from (d) to (e)). The temperature at which the weight increase occurs is related to the structure of the silicon, with silicon at the surface of a silicon structure oxidized at low temperatures and bulk silicon oxidized at higher temperatures. Therefore, the more coarse the silicon domains, the more oxidation is observed at higher temperatures.

Coarse silicon is defined herein as silicon that undergoes oxidation above 800° C. as determined by TGA, wherein the TGA is carried out in air with a temperature ramp rate of 10° C./min. This is shown in FIG. 1 as the mass increase from (d) to (e). The coarse bulk silicon content is therefore determined according to the following formula:

$$Z=1.875\times[(M_f-M_{800})/M_f]\times100\%$$

Wherein Z is the percentage of unoxidized silicon at 800° C., $M_{800}$ is the mass of the sample at 800° C. (mass (d) in FIG. 1), and $M_f$ is the mass of ash at completion of oxidation at 1400° C. (mass (e) in FIG. 1). For the purposes of this analysis, it is assumed that any mass increase above 800° C. corresponds to the oxidation of silicon to $SiO_2$ and that the total mass at completion of oxidation is $SiO_2$. For completeness, it will be understood that 1.875 is the molar mass ratio of $SiO_2$ to $O_2$ (i.e. the mass ratio of $SiO_2$ formed to the mass increase due to the addition of oxygen).

In a second aspect of the invention, there is provided a particulate material consisting of a plurality of core-shell composite particles obtainable by a process as described above.

In a third aspect of the invention, there is provided a particulate material consisting of a plurality of core-shell composite particles, wherein the core-shell composite particles comprise:

(a) a core comprising:
  (i) a porous carbon framework comprising micropores and/or mesopores, wherein the micropores and/or mesopores have a total pore volume as measured by gas adsorption of at least 0.4 cm³/g, and wherein the $PD_{50}$ pore diameter of the porous carbon framework is no more than 10 nm, preferably no more than 5 nm; and
  (ii) a plurality of electroactive material domains disposed within the micropores and/or mesopores of the porous carbon framework; and
(b) an outer shell of a pyrolytic conductive carbon material at least partially surrounding the core.

Optionally, the pyrolytic conductive carbon coating may also penetrate into the pores of the porous carbon framework.

The core-shell composite particles may have a range of different electroactive material loadings. For example, the amount of electroactive material in the precursor composite particles may be selected such that at least 25% and as much as 80% or more of the internal pore volume of the porous carbon framework is occupied by the electroactive material. For example, the electroactive material may occupy from 25% to 60%, or from 25% to 55%, or from 25% to 50%, or from 25% to 45%, or from 25% to 40% of the internal pore volume of the porous carbon framework. Within these preferred ranges, the pore volume of the porous carbon framework is effective to accommodate expansion of the electroactive material during charging and discharging, but avoids excess pore volume which does not contribute to the volumetric capacity of the core-shell composite particles. However, the amount of electroactive material is also not so high as to impede effective lithiation due to inadequate metal-ion diffusion rates or due to inadequate expansion volume resulting in mechanical resistance to lithiation.

The electroactive material in the precursor composite particles is preferably selected from silicon, tin, germanium, aluminium and mixtures thereof. A preferred electroactive material is silicon.

The core-shell composite particles are preferably substantially free from silicon carbide. The core-shell composite particles are preferably substantially free from silicon nitride. The presence or absence of silicon carbide and silicon nitride can be determined by X-Ray diffraction (XRD) analysis, for which suitable equipment and methodology is familiar to persons skilled in the art.

The core-shell composite particles preferably have a $D_{50}$ particle diameter in the range of 1.5 to 60 μm.

Optionally, the $D_{50}$ particle diameter of the core-shell composite particles may be at least 2 μm, or at least 3 μm, or at least 4 μm, or at least 5 μm. Optionally the $D_{50}$ particle diameter of the core-shell composite particles may be no more than 50 μm, or no more than 40 μm, or no more than 30 μm, or no more than 25 μm, or no more than 20 μm, or no more than 18 μm, or no more than 15 μm.

For instance, the core-shell composite particles may have a $D_{50}$ particle diameter in the range from 2 to 50 μm, or from 2 to 40 μm, or from 2 to 30 μm, or from 3 to 30 μm, or from 3 to 25 μm, or from 3 to 20 μm, or from 4 to 25 μm, or from 4 to 20 μm, or from 4 to 18 μm, or from 5 to 20 μm, or from 5 to 18 μm, or from 5 to 15 μm. Core-shell composite particles within these size ranges and having porosity and a pore diameter distribution as set out herein are ideally suited for the preparation of composite particles for use in anodes for metal-ion batteries due to good dispersibility in slurries, structural robustness, high capacity retention over repeated charge-discharge cycles, and suitability for forming dense electrode layers of uniform thickness in the conventional thickness range from 20 to 50 μm.

The core-shell composite particles preferably have a BET surface area of no more than 50 m²/g, preferably no more than 30 m²/g, more preferably no more than 15 m²/g, or no more than 12 m²/g, or no more than 10 m²/g, or no more than 8 m²/g, or no more than 6 m²/g, or no more than 5 m²/g. The composite particles have a BET surface area of at least 0.1 m²/g, or at least 0.5 m²/g, or at least 1 m²/g, or at least 2 m²/g, or at least 3 m²/g.

The particulate material of the invention may have specific capacity on lithiation of 1200 to 2340 mAh/g. This is measured per gram of the particulate material.

In a fourth aspect of the invention, there is provided a composition comprising the particulate material of the second or third aspect of the invention and at least one other component. The at least one other component may suitably be selected from one or more of: (i) a binder; (ii) a conductive additive; and (iii) an additional particulate electroactive material. The composition of the fourth aspect of the invention may be used in particular as an active layer in the anode of a metal-ion battery.

The composition may comprise from 1 to 95 wt %, or from 2 to 90 wt %, or from 5 to 85 wt %, or from 10 to 80 wt % of the particulate material of the invention, based on the total dry weight of the composition.

The binder may be present in an amount of from 0.5 to 20 wt %, or 1 to 15 wt %, or 2 to 10 wt %, based on the total dry weight of the electrode composition.

The one or more conductive additives may be present in a total amount of from 0.5 to 20 wt %, or 1 to 15 wt %, or 2 to 10 wt %, based on the total dry weight of the electrode composition.

The optional at least one additional particulate electroactive material may be selected from graphite, hard carbon, silicon, tin, germanium, gallium, aluminium and lead.

In a fifth aspect, the invention provides an electrode comprising a particulate material according to the second or third aspect of the invention in electrical contact with a current collector. Optionally, the particulate material may be in the form of a composition according to the fourth aspect of the invention.

In a sixth aspect, the invention provides a rechargeable metal-ion battery comprising:
(i) an anode, wherein the anode comprises an electrode according to the fifth aspect of the invention;
(ii) a cathode comprising a cathode active material capable of releasing and reabsorbing metal ions; and
(iii) an electrolyte between the anode and the cathode.

In a seventh aspect, the invention provides the use of a particulate material according to the second or third aspect of the invention as an anode active material. In this use, the particulate material may be in the form of a composition of the invention.

The invention will now be described with reference to the following examples and the accompanying figures in which.

EXAMPLES

Figure 1:
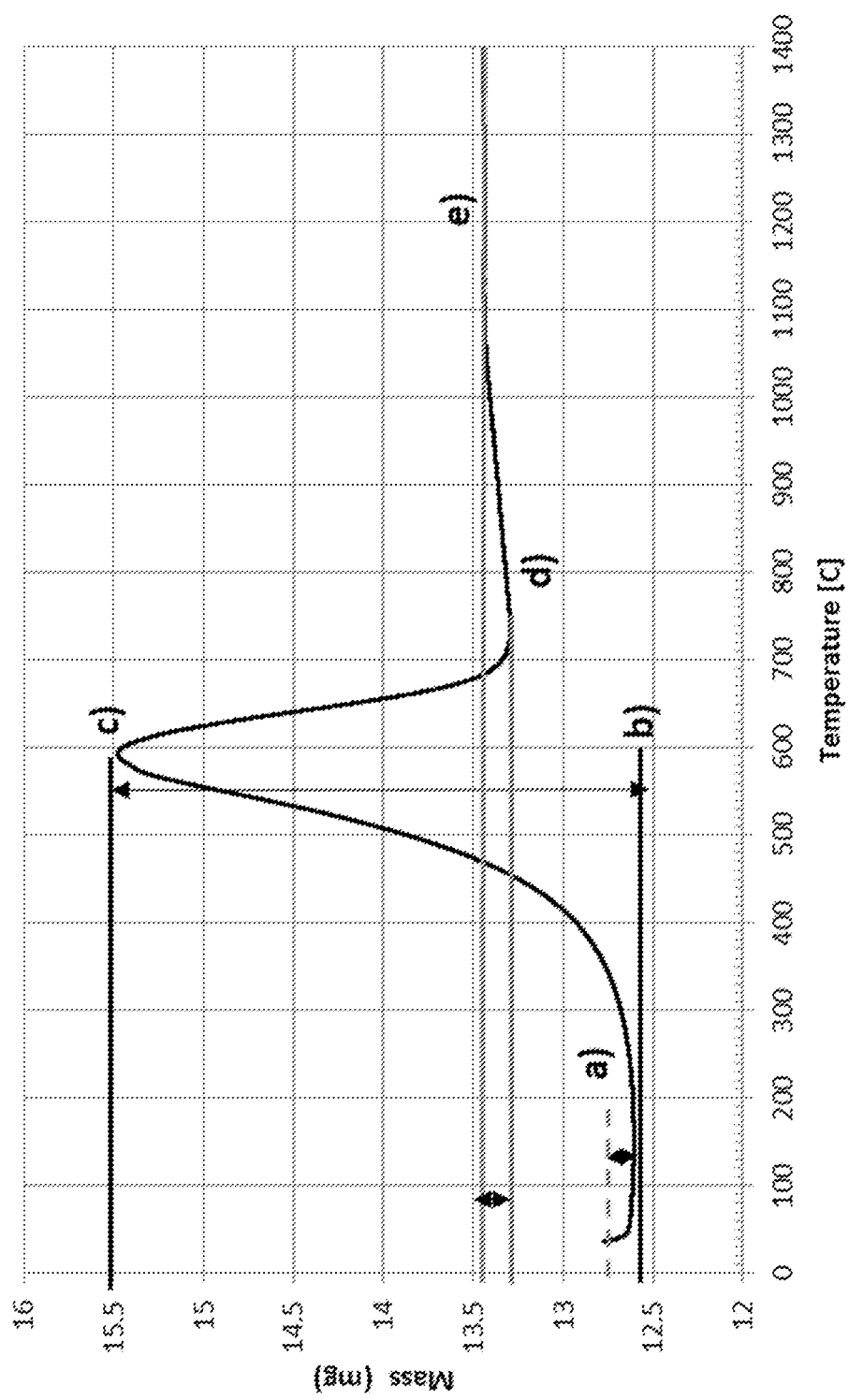
FIG. 1 shows the characteristic TGA trace for a particulate material according to the invention, comprising a low level of coarse silicon.

Porous carbon frameworks C1 to C3 used in the following examples have the characteristics set out in Table 1.

TABLE 1

| | Carbon No. | | |
|---|---|---|---|
| | C1 | C2 | C3 |
| $P_1$ (cm³/g) | 0.82 | 0.76 | 0.88 |
| BET (m²/g) | 1757 | 1637 | 1860 |
| $D_{50}$ (μm) | 98.8 | 2.9 | 3.1 |
| $PD_{50}$ (nm) | 1.18 | 1.26 | 1.41 |
| Micropore volume (cm³/g) | 0.50 | 0.44 | 0.48 |

Example 1: Preparation of Particulate Materials in a Fluidized Bed Reactor

Silicon-carbon composite particles were prepared in a vertical bubble-fluidized bed reactor comprising an 83 mm internal diameter stainless steel cylindrical vessel. A quantity of a powder of carbon framework particles with the properties listed in Table 1 is placed in the reactor. An inert gas (nitrogen) at a low flow rate is injected into the reactor to remove any oxygen. The reactor is then heated to a reaction temperature between 430 and 500° C. and 4% v/v monosilane gas diluted in nitrogen is supplied to the bottom of the reactor at a flow rate sufficient to fluidize the carbon framework particles, for a length of time sufficient to deposit the target mass of silicon. The reactor is purged for 30 minutes under nitrogen before being cooled down to room temperature over several hours. The atmosphere is then switched over to air gradually over a period of two hours by switching the gas flow from nitrogen to air from a compressed air supply.

Example 2: Preparation of the Particulate Material in a Static Furnace

Silicon-carbon composite particles were prepared by placing 1.8 g of a particulate porous framework with the properties listed in Table 1 on a stainless-steel plate at a constant thickness of 1 mm along its length. The plate was then placed inside a stainless-steel tube of outer diameter 60 mm with gas inlet and outlet lines located in the hot zone of a retort furnace. The furnace tube was purged with nitrogen gas for 30 minutes at room temperature, then the sample temperature was increased to between 450 and 475° C. The nitrogen gas flow-rate is adjusted to ensure a gas residence time of at least 90 seconds in the furnace tube and maintained at that rate for 30 minutes. Then, the gas supply is switched from nitrogen to a mixture of monosilane in nitrogen at 1.25 vol % concentration. Dosing of monosilane is performed over a period of up to 5-hours with a reactor pressure maintained at 101.3 kPa (1 atm). After dosing has finished the gas flow rate is kept constant whilst the silane is purged from the furnace using nitrogen. The furnace is purged for 30 minutes under nitrogen before being cooled down to room temperature over several hours. The atmosphere is then switched over to air gradually over a period of two hours by switching the gas flow from nitrogen to air from a compressed air supply.

Example 3: Determination of Coarse Silicon Wt %

The procedure used to calculate the coarse silicon for the composite materials of the examples was as follows. 10-20 mg of the sample under test was loaded into a 70 µL crucible. The sample was loaded into a Mettler Toledo TGA/DSC 3+ instrument with an Ar purge gas, $N_2$ padding gas and air reaction gas at 100 mL/min. The TGA furnace chamber was ramped from 25 to 1400° C. at a rate of 10° C./min. Data was collected at 1 s intervals.

The amount of coarse silicon was determined by finding the final mass of ash at the end of the TGA experiment and the mass at 800° C. The formula outlined above is used to calculate the Coarse Silicon (Z) value.

Example 4—Heat Treatment of Uncoated Particles

Silicon-carbon composite particles were prepared using 125 g of carbon C1 and the method of Example 1. The silicon-carbon composite particles were divided into five samples. Each sample was then individually jet milled for 25 minutes using a Hosokawa Alpine 50 AS spiral jet mill with feed gas pressure of 8 bar and a feeding rate of 8 rpm. The resulting volumetric particle size distribution after jet milling and before any heat treatment step was measured using laser diffraction as described herein above and is provided in Table 2.

The first sample was used as a reference sample and was not subjected to any further processing. The other four samples were flushed for 30 minutes in argon flow at 1 L/min flow rate and then the temperature was ramped at 5° C./min to a heat treatment temperature of 600° C., 700° C., 800° C., or 900° C. correspondingly, then held at the heat treatment temperature for 1 hour. The properties of the silicon-carbon composite precursor particles were measured after the heat treatment and compared to the reference sample.

Results

The reference sample and the heat-treated samples were subjected to various analyses to compare the effects of each temperature on the material properties.

Figure 2:
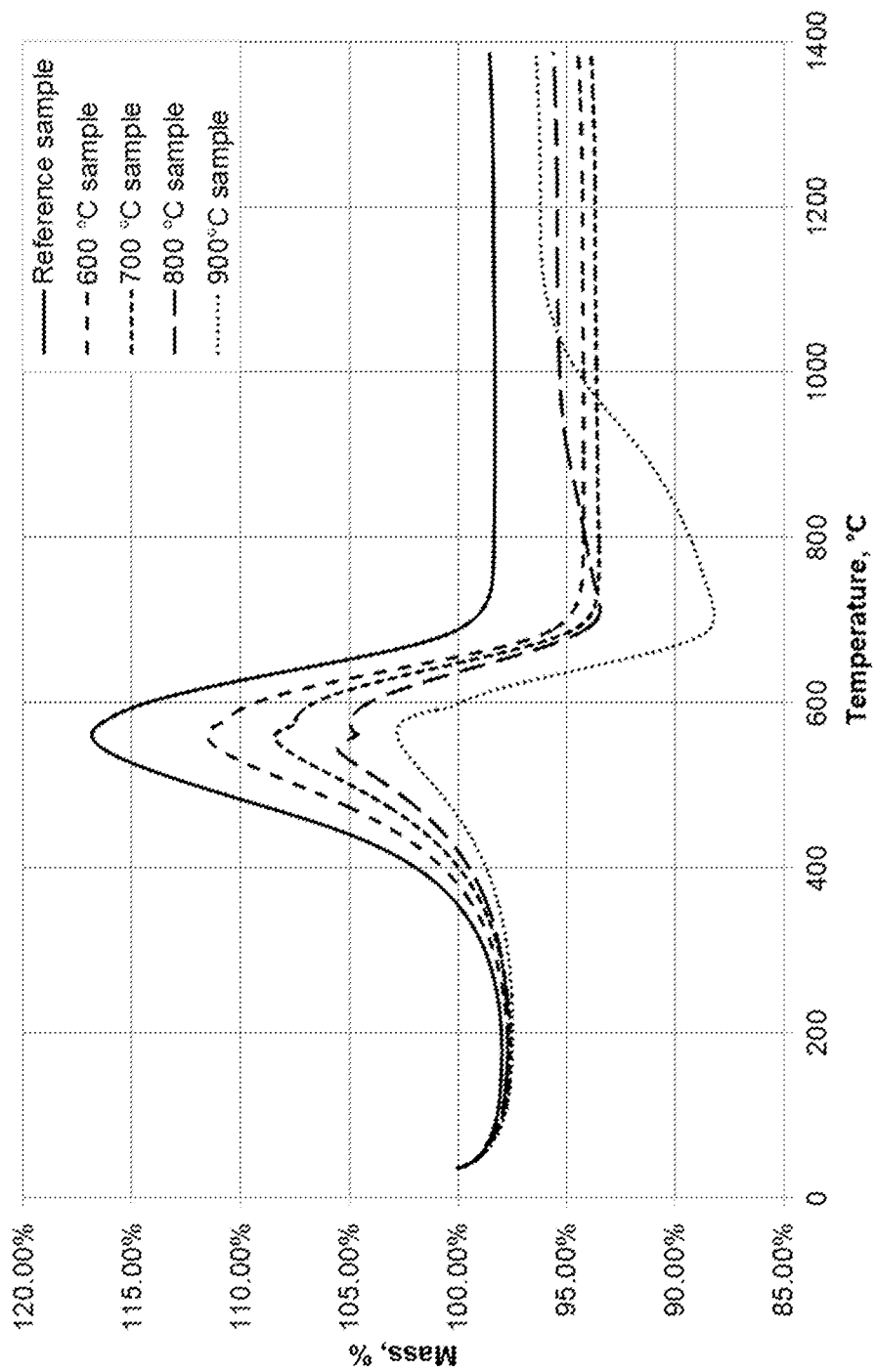
FIG. 2 shows thermogravimetric analysis (TGA) data for Example 4.

Thermogravimetric analysis (TGA) in air (FIG. 2) demonstrated that the samples subjected to heat treatments of 800° C. and 900° C. suffered from an annealing of the fine micropore structure and amalgamation of nanoscale silicon domains within the pore structure to form larger domains of silicon. The sample subjected to a heat treatment at 600° C. exhibited a TGA profile largely identical to the reference sample, demonstrating that a carbon coating step on these silicon-carbon composite precursor particles is highly unlikely to damage the fine micropore structure that is so desirable for use of the particulate material in an anode.

Figure 5:
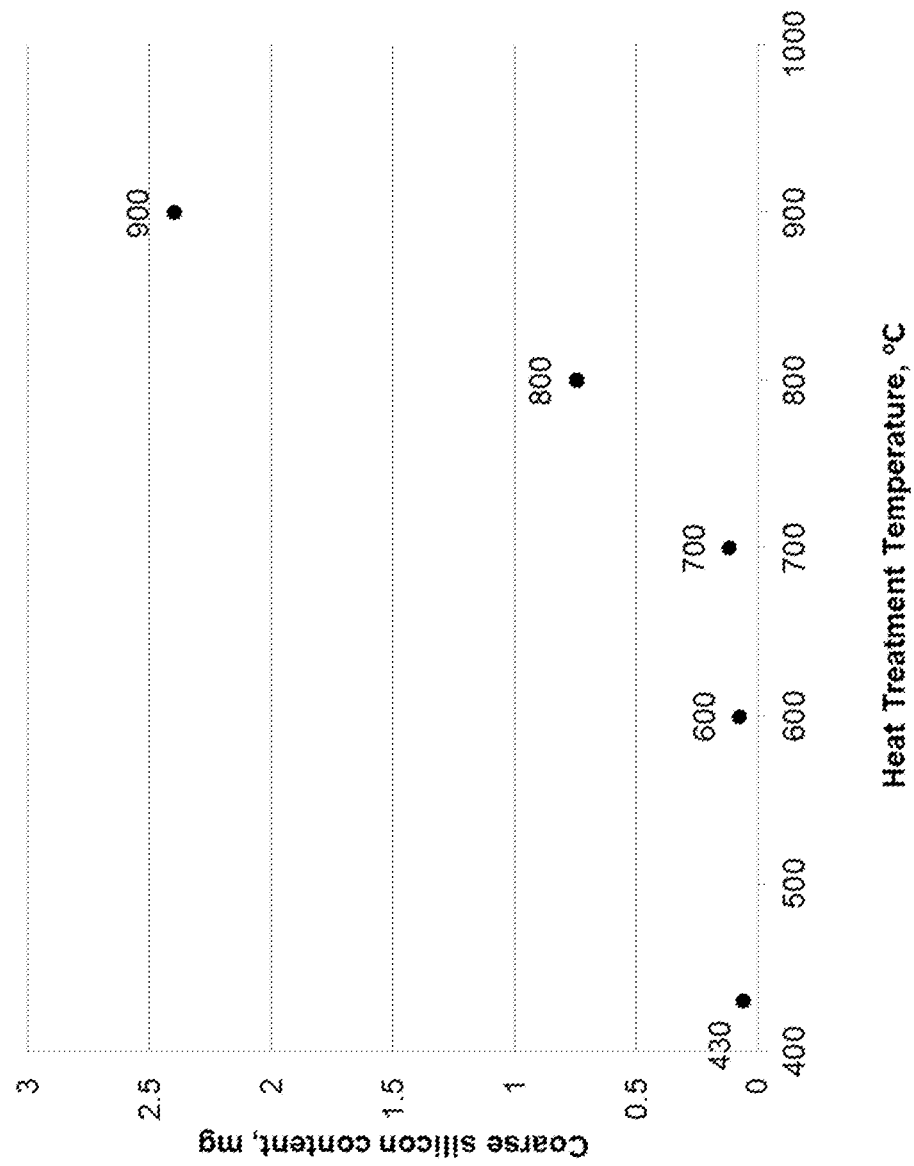
FIG. 5 shows the effect of temperature on coarse silicon content in Example 4.

The amount of coarse silicon, determined according to the method of Example 3, is shown for each sample in FIG. 5, with the reference sample denoted as 430 and other samples denoted according to the temperature of the heat treatment step to which they were subjected. In the final product, fine silicon is more desirable than coarse silicon. FIG. 5 demonstrates that any processing step carried out at a temperature above 700° C. is likely to give the finished particulate product a higher proportion of coarse silicon compared to products that were processed (such as coated with carbon) at temperatures of 700° C. or lower.

The samples were tested for the total pore volume and BET surface area using the methods described earlier.

TABLE 2

| Sample | Reference | Heat treated 600° C. | Heat treated 700° C. | Heat treated 800° C. | Heat treated 900° C. |
|---|---|---|---|---|---|
| BET, $m^2/g^1$ | 141.09 | 165.41 | 142.16 | 112.56 | 104.37 |
| Total pore volume, $cm^3/g$ | 0.0908 | 0.0993 | 0.0917 | 0.0779 | 0.069 |
| $D_{10}$, µm | 0.94 | 2.79 | 0.97 | 0.97 | 0.86 |
| $D_{50}$, µm | 2.52 | 5.63 | 2.71 | 2.76 | 2.52 |
| $D_{90}$, µm | 5.0 | 7.50 | 5.5 | 5.5 | 4.99 |
| $D_{98}$, µm | 6.6 | 11.0 | 7.4 | 7.5 | 6.66 |
| Density, $g/cm^3$ | 2.14 | 2.16 | | 2.24 | 2.36 |

These data show that the total pore volume decreases as the processing temperature is increased. The resulting total pore volume for the 800° C. and 900° C. samples is undesirably low and can be explained by the pores annealing out at these higher temperatures.

The total pore volume and the BET surface area are dependent on the particle size of the sample. The increase in the BET surface area and the total pore volume for the sample that was heat treated at 600° C. compared to the reference sample is accounted for by the fact that the 600° C. heat-treated sample had a larger particle size than all the other samples, because the samples were jet-milled individually.

Figure 3:
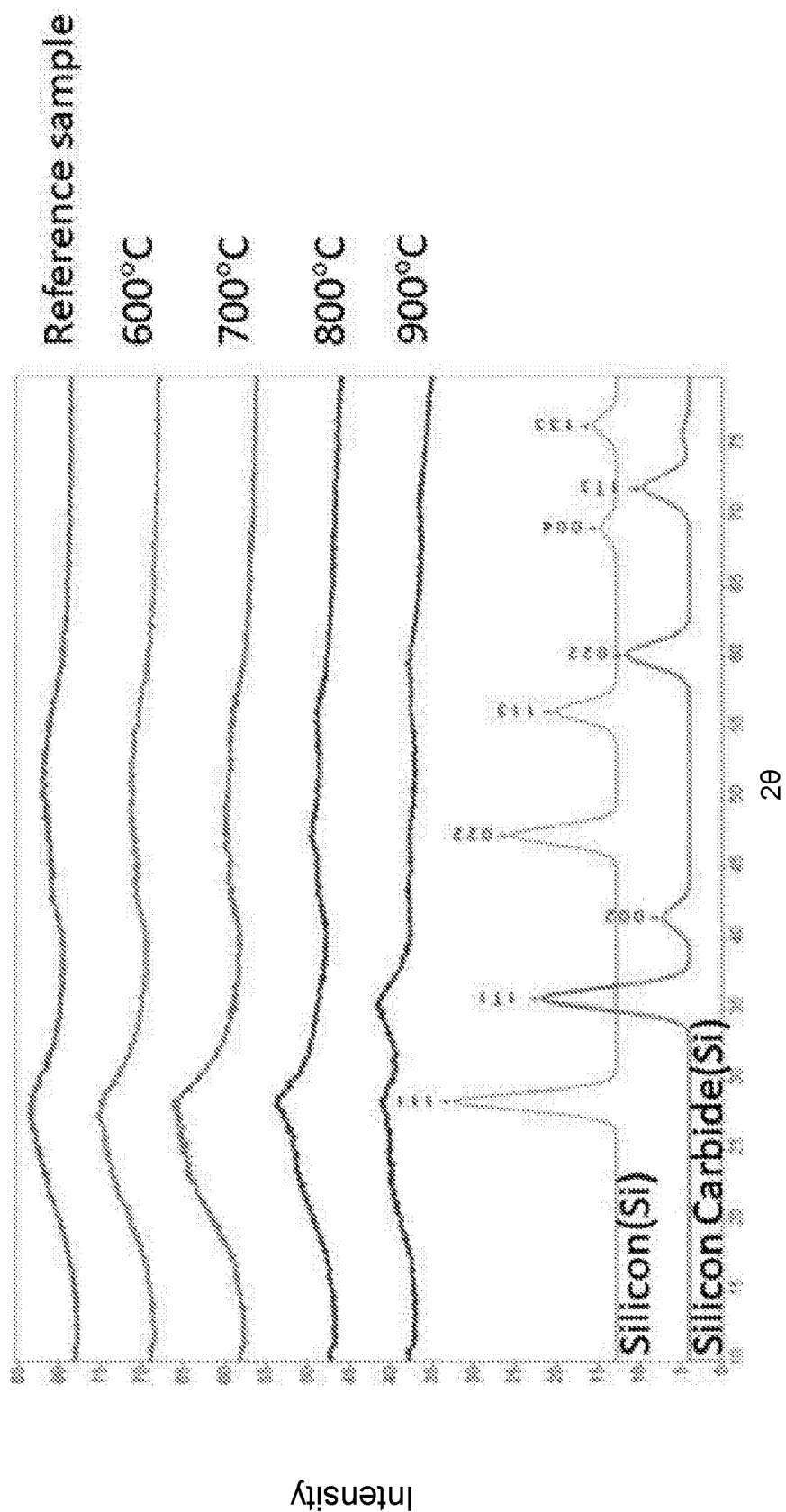
FIG. 3 shows X-Ray Diffraction (XRD) data for Example 4.

The five samples were further analysed for their chemical composition using X-Ray Diffraction (XRD). The results can be seen in FIG. 3.

Amorphous silicon characteristics, i.e. a broad peak, can be seen up to 700° C. and especially broad up to 600° C. Crystalline silicon is apparent in varying degrees in the 700° C., 800° C. and 900° C. samples and is particularly pronounced for the 800° C. and 900° C. samples.

Evidence of silicon carbide can also be clearly seen for the 900° C. sample. The formation of silicon carbide is undesirable for the silicon-carbon composite particles, because silicon carbide does not exhibit electrochemical activity and is a poor conductor and so formation of this compound will reduce the overall effectiveness of the product in the context of an anode.

Further tests were made on electrodes each incorporating one of the test samples of particulate material.

Example 5—Electrochemical Testing

Test coin cells were made with negative electrodes comprising the composite material prepared as described in Example 4. A dispersion of Carbon Super P (conductive carbon) in CMC binder was mixed in a Thinky™ mixer. The silicon-based material was added to the mixture and mixed for 30 min in the Thinky™ mixer. SBR binder was then added to give a CMC:SBR ratio of 1:1, yielding a slurry with a weight ratio of silicon-based material:CMC/SBR:conductive carbon of 70%:16%:14%. The slurry was further mixed for 30 minutes in the Thinky™ mixer, then was coated onto a 10 µm thick copper substrate (current collector) and dried at 50° C. for 10 minutes, followed by further drying at 110° C. for 12 hours to thereby form an electrode comprising an active layer on the copper substrate.

Coin half cells were made using circular electrodes of 0.8 cm radius cut from the electrode with a porous polyethylene separator, a lithium foil as the counter electrode and an electrolyte comprising 1M $LiPF_6$ in a 7:3 solution of EC/FEC (ethylene carbonate/fluoroethylene carbonate) containing 3 wt % vinylene carbonate.

These half cells were used to measure the initial volumetric energy density (VED2, $mAh/cm^3$), first cycle loss (FCL) and first delithiation capacity (DC1) of the active layer. The half cells were tested by applying a constant current of C/25, (wherein "C" represents the specific capacity of the electrode in mAh, and "25" refers to 25 hours), to lithiate the electrode comprising the porous particles, with a cut off voltage of 10 mV. When the cut off is reached, a constant voltage of 10 mV is applied with a cut off current of C/100. The cell is then rested for 10 minutes in the lithiated state. The electrode is then delithiated at a constant current of C/25 with a cut off voltage of 1V and the cell is then rested for 10 minutes. A constant current of C/25 is then applied to lithiate the cell a second time with a 10 mV cut off voltage, followed by a 10 mV constant voltage with a cut off current of C/100 and rest for 5 minutes.

Figure 4:
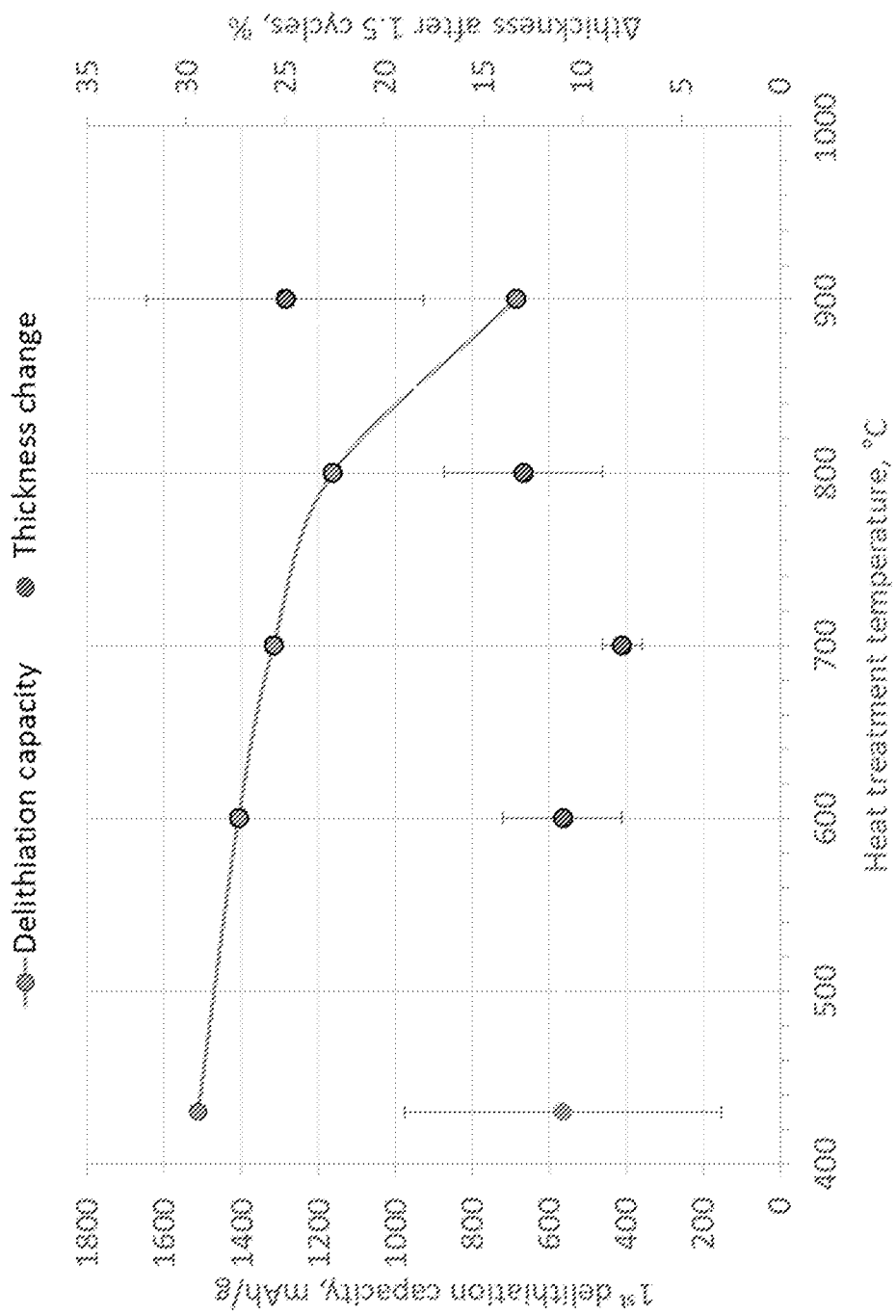
FIG. 4 shows cell data for Example 5.

The impact of the formation of silicon carbide on cell performance can be seen in FIG. 4. The delithiation capacity, measured as described above, markedly drops for the 900° C. heat-treated sample, demonstrating the deleterious effect of formation of silicon carbide on anode performance.

FIG. 4 also shows the thickness change of the electrode coating (excluding the current collector) for electrodes prepared and tested using half cells as described above. The thickness change in percentage is measured ex situ in the charged state, after removal of the anode following lithiation, delithiation and a second lithiation cycle in the lithium-ion half-cell. In other words, the thickness change is measured for the anode in its lithiated state.

Further electrode performance data for anodes each incorporating one of the samples was conducted. The results of these tests are shown in Table 3 and in FIG. 4.

These data show that the first lithiation capacity and the first delithiation capacity are both decreased when the heat treatment temperature of the sample incorporated into the electrode increased. The percentage of active silicon as a percentage of the total particle mass was also decreased as the heat treatment temperature increased. The active silicon content of the composite particles is calculated by dividing the first de-lithiation capacity of the helf-cell (in mAh per of the composite particles) by the theoretical capacity of silicon (3579 mAh/g) and representing the result as a percentage. The first cycle loss increases as the heat treatment temperature is increased and is particularly increased for the 900° C. treated sample. The anode thickness increased for all samples after 1.5 cycles; however the amount of thickness increase was roughly constant for the reference sample, the 600° C. treated sample and the 700° C. sample, whereas the 800° C. treated sample and the 900° C. treated samples exhibited a greater increase of electrode thickness. In the context of a battery, it is desirable to keep the electrode thickness as constant as possible.

Overall, the volumetric capacity of the anode was roughly the same for the 600° C. treated sample and the reference sample. It was slightly decreased for the 700° C. treated sample and was significantly decreased for the 800° C. and 900° C. treated samples.

These tests were conducted in a half cell with silicon-carbon composite precursor particles without a carbon coating. However, the results are expected to be replicated with the carbon coating and demonstrate the negative impact that a high-temperature carbon coating process would have on the properties of a carbon-coated particulate silicon-carbon composite product.

TABLE 3

|  | Heat treatment temperature, ° C. | | | | |
| --- | --- | --- | --- | --- | --- |
|  | Reference sample | 600 | 700 | 800 | 900 |
| total wt % silicon, measured | 48 | 47 | 44 | 47 | 46 |
| active silicon wt %, estimated | 42 | 39 | 37 | 32 | 19 |
| 1st lithiation capacity, mAh/g | 2077 ± 22 | 2003 ± 20 | 1941 ± 16 | 1754 ± 18 | 1237 ± 31 |
| 1st de-lithiation capacity, mAh/g | 1513 ± 18 | 1408 ± 11 | 1317 ± 9 | 1162 ± 13 | 687 ± 12 |
| % first cycle loss | 27.2 ± 0.5 | 29.7 ± 0.3 | 32.1 ± 0.4 | 33.7 ± 0.3 | 44.4 ± 0.5 |
| initial density, g/cm³ | 0.28 | 0.3 | 0.28 | 0.28 | 0.27 |
| final density, g/cm³ | 0.25 | 0.27 | 0.26 | 0.24 | 0.21 |
| % change in coating thickness | 11 ± 8 | 11 ± 3 | 8 ± 1 | 13 ± 4 | 25 ± 7 |
| volumetric capacity, mAh/cm³ | 263 | 266 | 241 | 197 | 104 |

The anodes that incorporated the particulate material that was subjected to 900° C. heat treatment suffered the largest increase of thickness, demonstrating that a carbon coating step at the same temperature would have an undesirable impact on the usefulness of the particulate material in an anode. Ordinarily the degree of electrode expansion would be expected to have a positive correlation with the amount of active silicon. However, the opposite was observed with the electrode containing the 900° C. sample. Without wishing to be bound by theory, it is believed that the fact that this electrode had the highest degree of expansion of all samples indicates that the structural and chemical relationship within the particulate material has been so badly degraded that particle expansion is no longer controlled. This excessive expansion is expected to quickly lead to isolated particles and poor cycle retention.

Example 6—Uncoated Samples

Test Protocol

Silicon-carbon composite particles were prepared using 125 g of carbon C1 and the method of Example 2. The heat treatment test protocol of Example 4 was repeated except that there was no jet milling step before the heat treatment step, and the heat treatment step was carried out in a nitrogen atmosphere instead of an argon atmosphere.

Results

Figure 6:
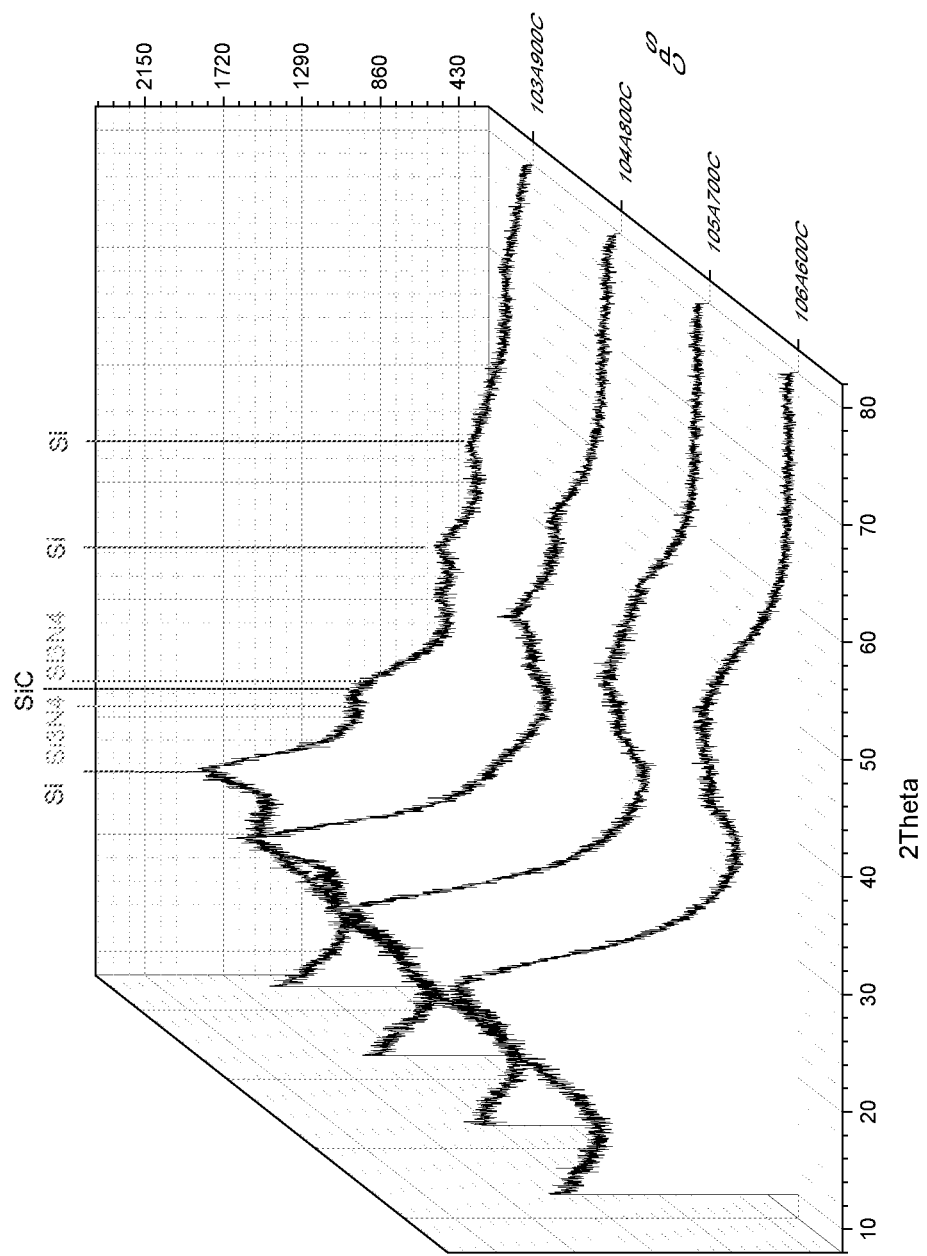
FIG. 6 shows XRD data for Example 6.

The heat-treated samples and the reference sample were analysed using XRD. The results are shown in FIG. 6; the heat treatment temperature for each sample can be seen on the right-hand side of the XRD plot with the 600° C. sample XRD trace shown at the front and the 900° C. sample XRD trace shown at the back.

An important effect that was observed to depend on the heat treatment temperature was formation of compounds. In particular, some non-electroactive compounds formed in the 800° C. and 900° C. samples, such as $Si_3N_4$ and SiC. This is an undesirable outcome because it reduces the overall capacity of the material, thereby reducing its value as an anode material. Furthermore, SiC is a poor electrical conductor; presence of SiC in the final product is therefore further undesirable because it could frustrate lithiation of silicon within the particulate material.

The absence of silicon nitride formation after heat treatment at temperatures of 700° C. and below is an important benefit because it shows that the method of the invention can be carried out in a nitrogen environment rather than an argon environment.

Likewise, crystallisation of silicon was observed in the 800° C. and 900° C. samples and this is undesirable: amorphous silicon is the preferred form of silicon for these materials.

With the 700° C. sample, a mixture of amorphous and crystalline silicon was observed from the XRD data. A small peak for crystalline silicon is superimposed on the broad amorphous peak at this temperature.

Where crystallisation of silicon occurred, it is believed that this may additionally be symptomatic of an increase in the average length scale of the silicon domains within the particulate material, caused by the heat treatment.

The deposition of a carbon coating in the method of the invention has a broadly similar time period to the length of time at which the samples in these tests were held at their respective temperatures. By testing the uncoated particles, the effect of the temperature on the fine interior structure of the composite particles can be more easily observed than when they are coated. It is expected that the same effects would be observed when carrying out carbon deposition at the same temperatures.

Therefore the method of the invention, in which the carbon deposition is carried out a temperature of no more than 700° C., is expected to avoid or lessen the deleterious effects that were observed at 800° C. and 900° C. in this experiment and therefore retain the beneficial fine microstructure that the inventors developed previously, whilst also obtaining the benefits of an electrically conductive coating and pore capping. At temperatures 600° C. and lower, the material properties of the particles are even better for use in an anode.

Example 7: Carbon Coating

A series of composite particle samples were prepared according to the method of Example 1 using carbon frameworks C2 and C3.

The precursor particles had the properties set out in Table 3. The amount of coarse silicon was determined using the TGA method described in Example 3. All of the composite particle samples contained less than 4 wt % of coarse silicon.

TABLE 3

| Composite No. | Carbon Framework | BET Surface Area (m²/g) | Si wt % | C wt % | Coarse Si wt % |
| --- | --- | --- | --- | --- | --- |
| N1 | C2 | 215 | 48.8 | 45.8 | 1.7 |
| N2 | C2 | 134 | 51.6 | 43.1 | 1.71 |
| N3 | C2 | 156 | 49.8 | 43.8 | 2.56 |
| N4 | C2 | 263 | 45.8 | 49.5 | 2.58 |
| N5 | C3 | 212 | 48.6 | 44.0 | 2.64 |
| N6 | C3 | 259 | 48.9 | 46.64 | 3.78 |
| N7 | C2 | 179 | 52.1 | 45.5 | 3.79 |

The composite particle samples described in Table 3 were carbon coated according to the following method. The composite particles (60 g) were placed into a stainless-steel tube (diameter 57 mm, length 500 mm) loaded into the heated zone of a rotary furnace (and sealed. The reactor space was purged with nitrogen at 0.2 L/min for 30 min. The furnace temperature was ramped up to the temperature specified in Table 4 under nitrogen flow. An excess amount of styrene was placed in a Dreschel bottle and heated in a water bath, up to 75° C. After 10 minutes of furnace temperature stabilisation, styrene was allowed to flow into the reactor tube for up to 90 minutes (as indicated in Table 4) by bubbling nitrogen of 2 L/min into the Dreschel bottle. The reactor was then purged with nitrogen and cooled down to ambient temperature under nitrogen, resulting in a carbon coated material.

Figure 7:
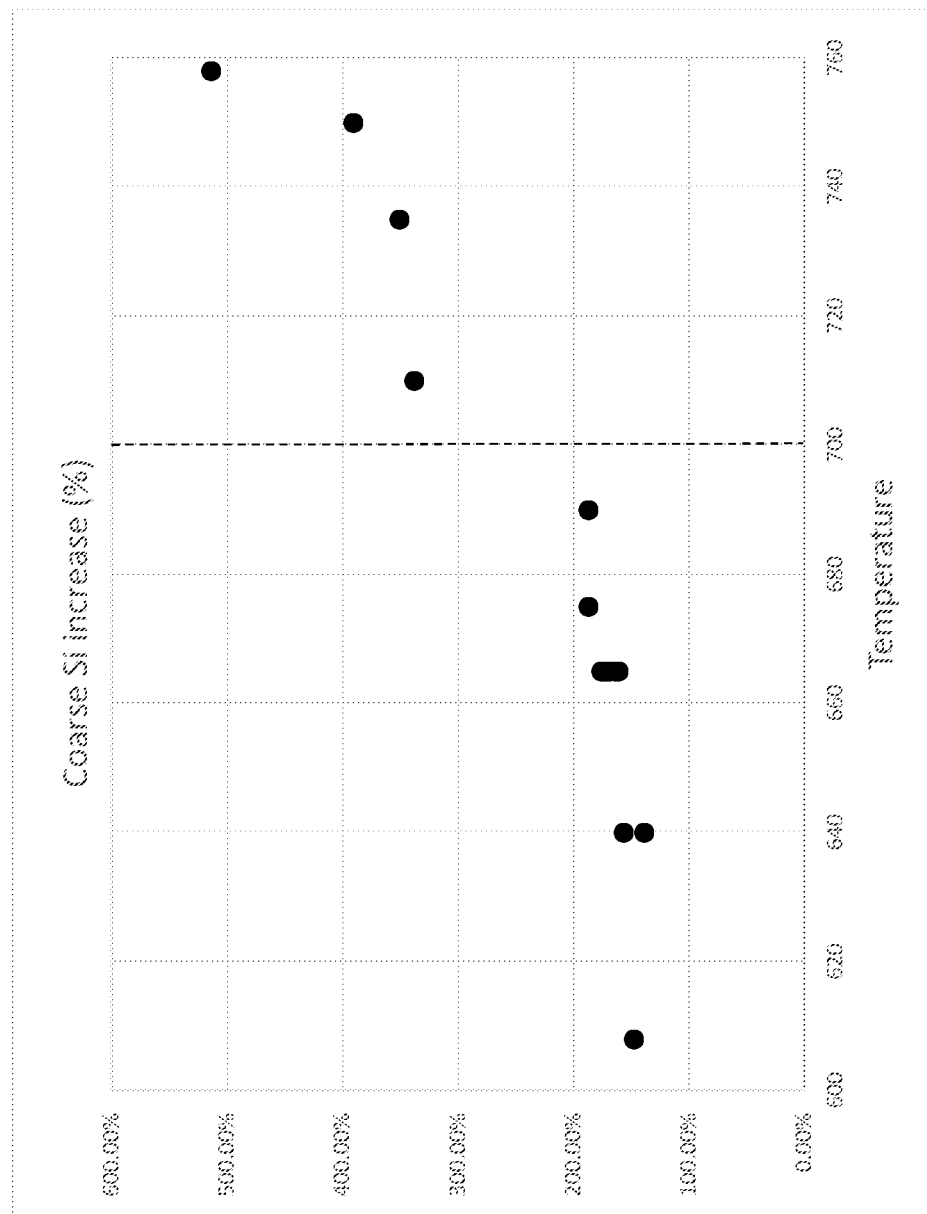
FIG. 7 shows the effect of temperature on coarse silicon content in Example 7.

Carbon-coated particles from Example 7 were analysed for their elemental composition and their coarse silicon content, again using the TGA method described in Example 3. The results are shown in Table 4 and in FIG. 7. All of the carbon-coated particles had a BET surface area in the range of 6-12 m²/g except for S1 (58 m²/g) and S10 (22 m²/g).

TABLE 4

| Sample No. | Composite No. | T (° C.) | Time (min) | Si wt % | C wt % | Coarse Si wt % | Coarse Si increase (%) |
| --- | --- | --- | --- | --- | --- | --- | --- |
| S1 | N1 | 608 | 90 | 44.9 | 47.8 | 2.51 | 147 |
| S2 | N2 | 640 | 90 | 48.4 | 45.0 | 2.67 | 156 |
| S3 | N6 | 640 | 90 | 43.2 | 50.0 | 5.23 | 138 |
| S4 | N3 | 665 | 90 | 45.6 | 45.8 | 4.42 | 172 |
| S5 | N3 | 665 | 90 | 48.0 | 45.0 | 4.32 | 169 |
| S6 | N3 | 665 | 90 | 46.7 | 44.9 | 4.47 | 175 |
| S7 | N7 | 665 | 90 | 42.9 | 45.5 | 6.38 | 168 |
| S8 | N7 | 665 | 90 | 43.0 | 47.3 | 6.19 | 163 |
| S9 | N6 | 665 | 90 | 42.1 | 50.7 | 6.07 | 160 |
| S10 | N5 | 675 | 60 | 43.3 | 48.1 | 4.90 | 186 |
| S11 | N6 | 690 | 67 | 41.6 | 50.8 | 7.04 | 186 |
| S12* | N1 | 710 | 60 | 47.3 | 49.0 | 5.73 | 337 |
| S13* | N4 | 735 | 60 | 30.8 | 56.3 | 9.03 | 350 |
| S14* | N5 | 750 | 60 | 40.6 | 50.4 | 10.30 | 390 |
| S15* | N1 | 758 | 60 | 40.8 | 51.4 | 8.73 | 513 |

*Comparative examples

The data in Table 4 shows that the relative increase in coarse silicon is below 190% in all cases when carbon coating is carried out at a temperature below 700° C. However, when the temperature is increased above 700° C., there is a significant increase in the amount of coarse silicon. This indicates that the particles coated at temperatures above 700° C. suffered from annealing of the fine micropore structure and amalgamation of nanoscale silicon domains within the pore structure to form larger domains of silicon. This therefore supports the hypothesis in Example 4 that the changes to the silicon domains observed when heating uncoated particles are also observed during the carbon coating process.

Example 8—Electrochemical Testing of Coated Particles

Negative electrode coatings (anodes) were prepared using the Si—C composite materials of Table 4 and were tested in full coin cells. To make the electrodes, a dispersion of carbon black in CMC binder was mixed in a Thinky™ mixer. The Si—C composite material was added to the mixture and mixed for 30 min in the Thinky™ mixer. SBR binder was then added to give a CMC:SBR ratio of 1:1, yielding a slurry with a weight ratio of Si—C composite material:CMC/SBR:carbon black of 70%:16%:14%. The slurry was further mixed for 30 min in the Thinky™ mixer, then was coated onto a 10 μm thick copper substrate (current collector) and dried at 50° C. for 10 minutes, followed by further drying at 110° C. for 12 hours to form a negative electrode with a coating density of 0.7±0.5 g/cm$^3$.

Full coin cells were made using circular negative electrodes of 0.8 cm radius cut from the negative electrodes with a porous polyethylene separator and a nickel manganese cobalt (NMC532) positive electrode. The positive and negative electrodes were designed to form a balanced pair, such that the capacity ratio of the positive to negative electrodes was 0.9. An electrolyte comprising 1M LiPF$_6$ in a solution of fluoroethylene carbonate, ethylene carbonate and ethyl methyl carbonate containing 3 wt % vinylene carbonate was then added to the cell before sealing.

The coin cells were cycled as follows: A constant current was applied at a rate of C/25, to lithiate the anode, with a cut off voltage of 4.3 V. When the cut off was reached, a constant voltage of 4.3 V is applied until a cut off current of C/100 is reached. The cell was then rested for 10 minutes in the lithiated state. The anode is then delithiated at a constant current of C/25 with a cut off voltage of 2.75 V. The cell was then rested for 10 minutes. After this initial cycle, a constant current of C/2 was applied to lithiate the anode with a 4.3 V cut off voltage, followed by a 4.3 V constant voltage with a cut off current of C/40 with rest time of 5 minutes. The anode was then delithiated at a constant current of C/2 with a 2.75V cut off. This was then repeated for the desired number of cycles. The capacity retention at 100 cycles (CR100) and 200 cycles (CR200) was calculated and is given in Table 5 along with the 1st lithiation capacity, the 1st delithiation capacity and the first cycle loss (FCL).

The charge (lithiation) and discharge (delithiation) capacities for each cycle are calculated per unit mass of the silicon-carbon composite material and the capacity retention value is calculated for each discharge capacity as a percentage of the discharge capacity on the second cycle. The first cycle loss (FCL) is (1−(1$^{st}$ delithiation capacity/1$^{st}$ lithiation capacity))×100%. The values in Table 5 are averaged over 3 coin cells for each material.

The active silicon level is determined from half cell experiments as described in Example 5.

Figure 8:
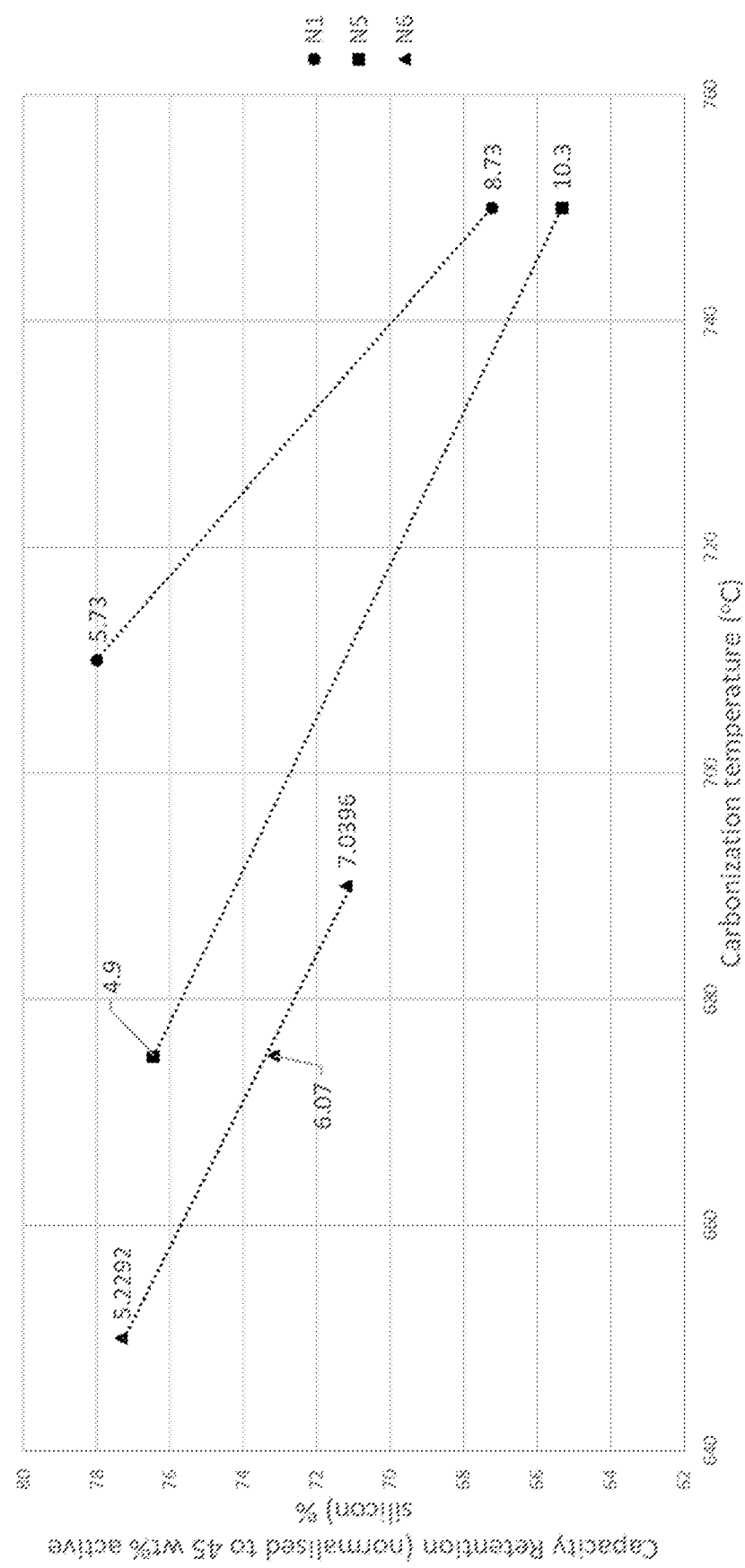
FIG. 8 shows the effect of temperature on capacity retention at 100 cycles. The numbers against each data point indicate the level of coarse silicon.
Figure 9:
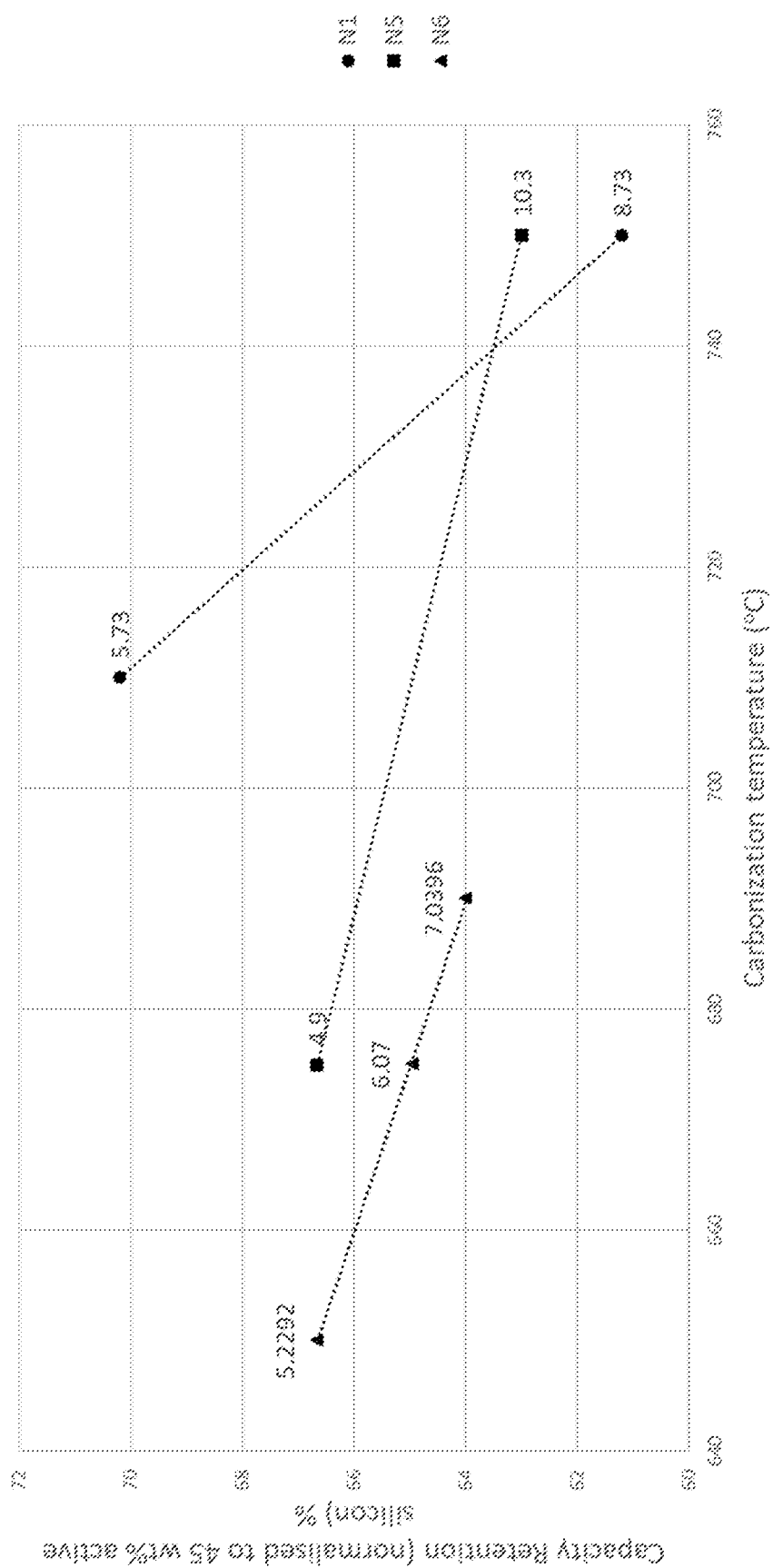
FIG. 9 shows the effect of temperature on capacity retention at 200 cycles. The numbers against each data point indicate the level of coarse silicon.

The data in Table 5 shows that the increase in the coarse Si wt % as the carbon coating temperature increases is reflected in inferior electrochemical performance. As the level of coarse silicon increases, the amount of active silicon in the material (as determined from half cells) decreases, the initial lithiation and delithiation capacity of the material is reduced, and normalised capacity retention over multiple charge discharge cycles is reduced. The normalised capacity retention of these materials is shown in FIGS. 8 and 9.

TABLE 5

| Sample No. (composite No.) | Coating T ° C. | Coarse Si wt % | Active Si % | 1st lith. mAh/g | 1st delith. mAh/g | FCL % | CR100** % | CR200** % |
|---|---|---|---|---|---|---|---|---|
| S3 (N6) | 640 | 5.23 | 40 | 1669 ± 14 | 1054 ± 5 | 36.8 ± 0.2 | 77 | 67 |
| S9 (N6) | 665 | 6.07 | 37 | 1586 ± 3 | 992 ± 14 | 37.4 ± 1 | 73 | 65 |
| S11 (N6) | 690 | 7.04 | 36 | 1523 ± 2 | 984 ± 6 | 35.4 ± 0.3 | 71 | 64 |
| S10 (N5) | 675 | 4.9 | 40 | 1773 ± 5 | 1242 ± 13 | 29.9 ± 0.5 | 76 | 67 |
| S14 (N5) | 750 | 10.3 | 35 | 1534 ± 7 | 1068 ± 10 | 30.4 ± 0.9 | 65 | 63 |
| S12 (N1) | 710 | 5.73 | 39 | 1674 ± 12 | 1212 ± 23 | 27.6 ± 0.9 | 78 | 70 |
| S15 (N1) | 758 | 8.73 | 34 | 1458 ± 8 | 1067 ± 10 | 26.8 ± 0.4 | 67 | 61 |

*Comparative samples
**To facilitate comparison between samples having different initial capacities, the capacity retention values in Table 5 are normalised to 45 wt % active silicon by multiplying the percent capacity retention by the Active Si value and dividing by 45.

The invention claimed is:

1. A process for preparing core-shell composite particles, the process comprising:
   (a) providing a plurality of precursor composite particles comprising:
      i. a porous carbon framework comprising micropores and/or mesopores, wherein the total pore volume of micropores and mesopores is at least 0.4 cm$^3$/g, and wherein the PD$^{50}$ pore diameter of the porous carbon framework is no more than 10 nm;
         wherein the total pore volume of micropores and mesopores and the PD$_{50}$ pore diameter of the porous carbon framework are measured by nitrogen gas absorption at 77 K down to a 15 relative pressure p/p$_0$ of 10$^{-6}$ using QSDFT in accordance with ISO 15901-2 and ISO 15901-3; and
      ii. a plurality of nanoscale silicon domains disposed with the porous carbon framework;
   (b) subjecting the plurality of precursor composite particles to a heat treatment in contact with a pyrolytic carbon precursor such that an outer shell of a pyrolytic conductive carbon material is formed on the precursor composite particles, wherein the heat treatment is carried out at a temperature of no more than 680° C.;

wherein the step (a) of providing a plurality of precursor composite particles comprises contacting a silicon precursor gas with a plurality of porous carbon particles at a temperature of between 200 and 500° C.

2. A process according to claim 1, wherein the heat treatment in step (b) is carried out at a temperature of no more than 650° C.

3. A process according to claim 1, wherein the heat treatment is carried out at a temperature of at least 500° C.

4. A process according to claim 1, wherein the pyrolytic carbon precursor is contacted with the composite particles as a vapour.

5. A process according to claim 4, wherein the pyrolytic carbon precursor is selected from polyaromatic hydrocarbons comprising from 10 to 25 carbon atoms and optionally from 1 to 3 heteroatoms, bicyclic monoterpenoids; and $C_2$-$C_{10}$ hydrocarbons.

6. A process according to claim 5, wherein the pyrolytic carbon precursor is selected from
(i) naphthalene, anthracene, tetracene, pentacene, fluorene, acenapthene, phenanthrene, fluoranthrene, pyrene, chrysene, perylene, coronene, fluorenone, anthraquinone, anthrone and alkyl-substituted derivatives thereof,
(ii) camphor, borneol, eucalyptol, camphene, careen, sabinene, thujene and pinene; and
(iii) methane, ethylene, propylene and acetylene.

7. A process according to claim 1, wherein the pyrolytic carbon precursor vapour is contacted with a transition metal catalyst at a temperature of at least 500° C. prior to contact with the composite particles.

8. A process according to claim 7, wherein the transition metal catalyst comprises nickel, iron, cobalt, copper and mixtures thereof.

9. A process according to claim 7, wherein the transition metal catalyst is disposed on the surface of the composite particles.

10. A process according to claim 7, wherein gaseous nickel carbonyl is thermally decomposed to deposit nickel onto the surface of the composite particles prior to step (b).

11. A process according to claim 10, wherein the carbon-coated particulate material is contacted with carbon monoxide gas after step (b) to form gaseous nickel carbonyl, thereby removing nickel from the carbon-coated composite particles.

12. A process according to claim 1, wherein step (b) comprises contacting the composite particles with a solution or dispersion of a pyrolytic carbon precursor in a solvent, and removing the solvent to provide composite particles coated with the pyrolytic carbon precursor, prior to the heat treatment.

13. A process according to claim 12, wherein the pyrolytic carbon precursor is a polymer or oligomer comprising a carbon-containing backbone.

14. A process according to claim 1, wherein the outer shell of pyrolytic conductive carbon material has a thickness of no more than 10 nm.

15. A process according to claim 1, wherein
the total pore volume of micropores and mesopores of the porous carbon framework as measured by gas adsorption is at least 0.45 cm$^3$/g and no more than 2.2 cm$^3$/g;
the $PD_{50}$ so pore diameter of the porous carbon framework is no more than 8 nm;
the precursor composite particles have a $D_{50}$ particle diameter of at least 1 μm and no more than 50 μm.

16. A process according to claim 1, wherein the electroactive material is silicon.

17. A process according to claim 1, wherein the duration of the heat treatment in step (b) is from 1 to 3 hours.

18. A particulate material consisting of a plurality of core-shell composite particles obtainable by a process according to claim 1.

19. A process for preparing core-shell composite particles, the process comprising:
(a) providing a plurality of precursor composite particles comprising:
  i. a porous carbon framework comprising micropores and/or mesopores, wherein a total pore volume of micropores and mesopores is at least 0.4 cm$^3$/g, and wherein a $PD^{50}$ pore diameter of the porous carbon framework is no more than 10 nm;
  ii. a plurality of nanoscale silicon domains disposed with the porous carbon framework;
(b) subjecting the plurality of precursor composite particles to a heat treatment in contact with a pyrolytic carbon precursor vapor such that an outer shell of a pyrolytic conductive carbon material is formed on the plurality of precursor composite particles, wherein the heat treatment is carried out at a temperature of no more than 680° C.;
wherein the pyrolytic carbon precursor vapor is contacted with a transition metal catalyst at a temperature of at least 500° C. prior to contact with the plurality of precursor composite particles.

20. A process according to claim 19, wherein the transition metal catalyst comprises nickel, iron, cobalt, copper and mixtures thereof.

21. A process according to claim 19, wherein the transition metal catalyst is disposed on a surface of the composite particles.

22. A process according to claim 19, wherein gaseous nickel carbonyl is thermally decomposed to deposit nickel onto a surface of the composite particles prior to step (b).

23. A process according to claim 22, wherein the carbon-coated particulate material is contacted with carbon monoxide gas after step (b) to form gaseous nickel carbonyl, thereby removing nickel from the carbon-coated composite particles.

* * * * *